US012749317B2

(12) United States Patent
Arata et al.

(10) Patent No.: US 12,749,317 B2
(45) Date of Patent: Sep. 29, 2026

(54) STATE ESTIMATION DEVICE, STATE ESTIMATION METHOD, AND STATE ESTIMATION PROGRAM

(71) Applicant: KYOCERA Corporation, Kyoto (JP)

(72) Inventors: Koji Arata, Yokohama (JP); Zhiqiang Hu, Yokohama (JP); Yoshitaka Mikuni, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/992,099

(22) PCT Filed: Jul. 6, 2023

(86) PCT No.: PCT/JP2023/025096

§ 371 (c)(1),
(2) Date: Jan. 7, 2025

(87) PCT Pub. No.: WO2024/018909

PCT Pub. Date: Jan. 25, 2024

(65) Prior Publication Data

US 2026/0004591 A1 Jan. 1, 2026

(30) Foreign Application Priority Data

Jul. 21, 2022 (JP) ................................ 2022-116422

(51) Int. Cl.
*G06V 20/54* (2022.01)
*G06T 7/70* (2017.01)
*G06V 10/44* (2022.01)

(52) U.S. Cl.
CPC ................ *G06V 20/54* (2022.01); *G06T 7/70* (2017.01); *G06V 10/44* (2022.01)

(58) Field of Classification Search
CPC ........... G06V 20/54; G06V 10/44; G06T 7/70
(Continued)

(56) References Cited

U.S. PATENT DOCUMENTS 10,272,838 B1 * 4/2019 Pertsel ................... B60Q 5/005
2015/0287197 A1 * 10/2015 Nakai ........................ G06T 7/80
348/187
2022/0398851 A1 * 12/2022 Nehmadi .............. G01S 7/4808

FOREIGN PATENT DOCUMENTS

EP 902 250 A1 10/2021
JP 2012-010036 A 1/2012

(Continued)

*Primary Examiner* — Daquan Zhao
(74) *Attorney, Agent, or Firm* — Studebaker Brackett PLLC

(57) ABSTRACT

A state estimation device (100) includes a first state estimator for estimating first feature amount data from input image data, a second state estimator for estimating second feature amount data from input image data, a feature estimator for estimating installation state parameters of an imaging device having obtained input image data by imaging from data obtained by combining first feature amount data and second feature amount data with a state estimation model subjected to machine learning so as to estimate installation state parameters of the imaging device having obtained input image data by imaging by using third teacher data including image data obtained by the imaging device having obtained a traffic environment by imaging and correct value data of the installation state parameters of the imaging device having obtained the image data by imaging, and a diagnosis unit for diagnosing an installation state of the imaging device based on the estimated installation state parameter.

9 Claims, 12 Drawing Sheets

(58) Field of Classification Search
USPC ....................... 348/61, 64, 73, 118, 120, 148
See application file for complete search history.

(56) References Cited

FOREIGN PATENT DOCUMENTS

| | | | |
|---|---|---|---|
| JP | 2017-129942 | A | 7/2017 |
| JP | 2021-174044 | A | 11/2021 |

* cited by examiner

STATE ESTIMATION DEVICE, STATE ESTIMATION METHOD, AND STATE ESTIMATION PROGRAM

TECHNICAL FIELD

The present application relates to a state estimation device, a state estimation method, and a state estimation program.

BACKGROUND OF INVENTION

Known cameras installed on roads or roadsides or the like of the roads perform calibration. Patent Document 1 discloses that calibration is performed using a measurement vehicle on which a GPS receiver, a data transmitter, a marker, and the like are mounted. Patent Document 2 discloses that, in camera calibration, road plane parameters are estimated based on a direction of a line existing on a road plane and a direction expressed by an arithmetic expression including the road plane parameters, when the direction of the line is input in a captured image.

CITATION LIST

Patent Literature

Patent Document 1: JP 2012-10036 A
Patent Document 2: JP 2017-129942 A

SUMMARY

Problem to be Solved

According to Patent Document 1, a measurement vehicle is necessary, and an operator is necessary when performing calibration. Patent Document 2 has the problem that lanes on a road need to be manually input into an image, which takes time and effort. Accordingly, there has been a need for a known imaging device that images roads to estimate an installation state of the imaging device that images a traffic environment without requiring manual work or traffic regulation.

Solution to Problem

In one aspect, a state estimation device includes a first state estimator trained to estimate first feature amount data from first image data including a moving object obtained by an imaging device by imaging, a second state estimator trained to estimate second feature amount data from second image data including a road obtained by the imaging device by imaging, and a feature estimator trained to estimate installation state parameters of the imaging device having obtained input image data by imaging from the first feature amount data and the second feature amount data.

In one aspect, a state estimation device includes a first state estimator configured to estimate first feature amount data from input image data with a first object estimation model subjected to machine learning so as to estimate the first feature amount data obtained by estimating a feature amount of a first extraction target from input first image data by using first teacher data including the first image data obtained by an imaging device having imaged a traffic environment and first correct value data of the first extraction target including a moving object included in the first image data, a second state estimator configured to estimate second feature amount data from input image data with a second object estimation model subjected to machine learning so as to estimate the second feature amount data obtained by estimating the feature amount of the first extraction target from the input first image data by using second teacher data including second image data obtained by an imaging device having imaged a traffic environment and second correct value data of a second extraction target including a road included in the second image data, a feature estimator configured to estimate installation state parameters of an imaging device having obtained the input image data by imaging from data obtained by combining the first feature amount data and the second feature amount data with a state estimation model subjected to machine learning to estimate the installation state parameters of the imaging device having obtained the input image data by imaging by using third teacher data including image data obtained by the imaging device having imaged a traffic environment and correct value data of the installation state parameters of the imaging device having obtained the image data by imaging, and a diagnosis unit configured to diagnose an installation state of the imaging device based on the estimated installation state parameters.

In one aspect, a state estimation method is performed by a computer, the method including estimating first feature amount data from input image data with a first object estimation model subjected to machine learning so as to estimate the first feature amount data obtained by estimating a feature amount of a first extraction target from input first image data by using first teacher data including the first image data obtained by an imaging device having imaged a traffic environment and first correct value data of the first extraction target including a moving object included in the first image data, estimating second feature amount data from input image data with a second object estimation model subjected to machine learning so as to estimate the second feature amount data obtained by estimating the feature amount of the first extraction target from the input first image data by using second teacher data including second image data obtained by an imaging device having imaged a traffic environment and second correct value data of a second extraction target including a road included in the second image data, estimating installation state parameters of an imaging device having obtained the input image data by imaging from data obtained by combining the first feature amount data and the second feature amount data with a state estimation model subjected to machine learning to estimate the installation state parameters of the imaging device having obtained the input image data by imaging by using third teacher data including image data obtained by the imaging device having imaged a traffic environment and correct value data of the installation state parameters of the imaging device having obtained the image data by imaging, and diagnosing an installation state of the imaging device based on the estimated installation state parameters.

In one aspect, a state estimation program causes a computer to execute estimating first feature amount data from input image data with a first object estimation model subjected to machine learning so as to estimate the first feature amount data obtained by estimating a feature amount of a first extraction target from input first image data by using first teacher data including the first image data obtained by an imaging device having imaged a traffic environment and first correct value data of the first extraction target including a moving object included in the first image data, estimating second feature amount data from input image data with a second object estimation model subjected to machine learning ing so as to estimate the second feature amount data obtained by estimating the feature amount of the first extraction target from the input first image data by using second teacher data including second image data obtained by an imaging device having imaged a traffic environment and second correct value data of a second extraction target including a road included in the second image data, estimating installation state parameters of an imaging device having obtained the input image data by imaging from data obtained by combining the first feature amount data and the second feature amount data with a state estimation model subjected to machine learning to estimate the installation state parameters of the imaging device having obtained the input image data by imaging by using third teacher data including image data obtained by the imaging device having imaged a traffic environment and correct value data of the installation state parameters of the imaging device having obtained the image data by imaging, and diagnosing an installation state of the imaging device based on the estimated installation state parameters.

DESCRIPTION OF EMBODIMENTS

A plurality of embodiments for implementing a state estimation device, a state estimation method, and a state estimation program, according to the present application will be described in detail with reference to the drawings. Note that the following description is not intended to limit the present invention. Constituent elements in the following description include those that can be easily assumed by a person skilled in the art, those that are substantially identical to the constituent elements, and those within a so-called range of equivalents. In the following description, the same reference signs may be assigned to the same constituent elements. Redundant description may be omitted.

System Overview

In a known system, a dedicated jig and work are required to link a captured image with the real world using information about an installation state of an imaging device. Since imaging devices are installed near roads, road regulation work needs to be performed for known systems. The state estimation device according to the present embodiment eliminates the need to perform work using a jig, road regulation work, and the like, and contributes to the widespread use of an imaging device 10 in a traffic environment.

Figure 1:
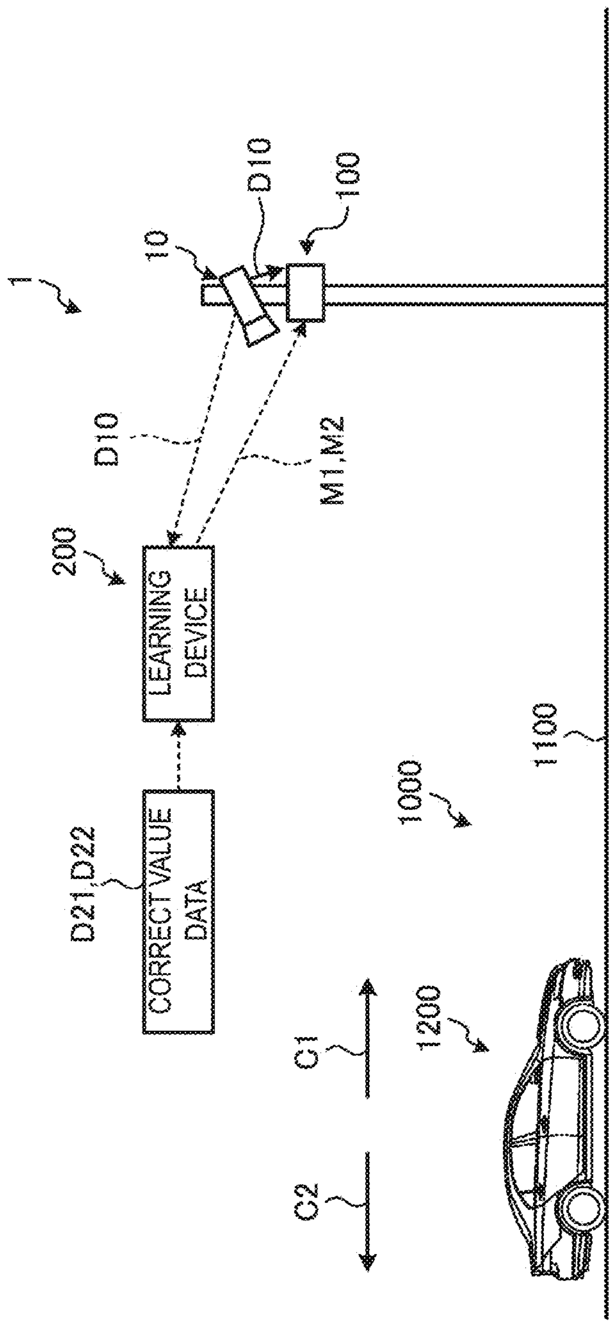
FIG. 1 is a diagram for describing a relationship example between a learning device and a state estimation device according to an embodiment.
Figure 2:
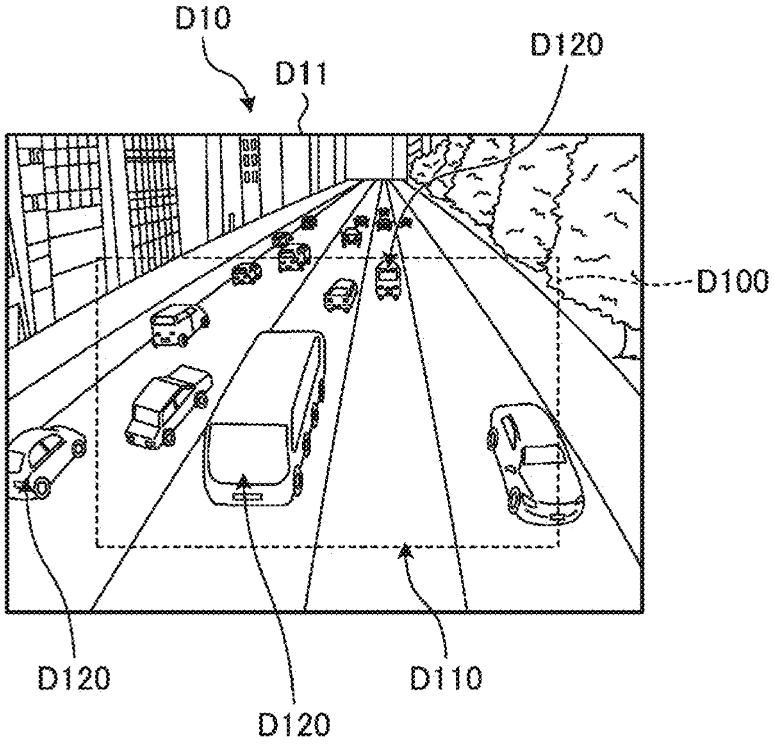
FIG. 2 is a diagram illustrating an example of image data obtained by an imaging device by imaging illustrated in FIG. 1.

FIG. 1 is a diagram for describing a relationship example between a learning device and the state estimation device according to the embodiment. FIG. 2 is a diagram illustrating an example of image data obtained by an imaging device by imaging illustrated in FIG. 1. As illustrated in FIG. 1, a system 1 includes the imaging device 10 and a state estimation device 100. The imaging device 10 can acquire image data D10 obtained by imaging a traffic environment 1000. The state estimation device 100 has a function of acquiring the image data D10 from the imaging device 10 and estimating the installation state of the imaging device 10 based on the image data D10. The imaging device 10 and the state estimation device 100 are capable of communicating by wire or wirelessly. A case where the system 1 includes one imaging device 10 and one state estimation device 100 will be described using the example illustrated in FIG. 1 for simplification of description. However, a plurality of the imaging devices 10 and the state estimation devices 100 may be used.

The imaging device 10 is installed so as to be able to image the traffic environment 1000 including a road 1100 and a traffic object 1200 moving on the road 1100. The traffic object 1200 moving on the road 1100 includes, for example, a vehicle or a person that can move on the road 1100. The traffic object 1200 includes, for example, a large car, an ordinary car, a large special car, a large motorcycle, an ordinary motorcycle, and a small special car defined by the Road Traffic Act, but may include another vehicle or moving object. Note that the large car includes a car whose total weight is 8000 kg or more, a car whose maximum loading capacity is 5000 kg or more, or a car (such as a bus or truck) whose boarding capacity is 11 persons or more. The imaging device 10 can electronically capture images using an imaging sensor such as a Charge Coupled Device (CCD) or a Complementary Metal Oxide Semiconductor (CMOS). The imaging device 10 is installed with an imaging direction of the imaging device 10 directed to a road plane of the traffic environment 1000. The imaging device 10 can be installed at, for example, roads, intersections, parking lots, and the like. The road 1100 imaged by the imaging device 10 may include a shape of a road such as a straight line, a degree of curve, or a gradient, a sign installed on the road, a shape of a median strip, a line, a mark, or a sign drawn on the road, a guardrail, a streetlight, a tree, a sidewalk, a destination guide plate, an advertisement, and a fluorescent material for drawing attention to a road shape such as a curve.

In the example illustrated in FIG. 1, the imaging device 10 is installed on a roadside at an installation angle at which the imaging device 10 can capture a bird's-eye view image of an imaging area of the traffic environment 1000 including the road 1100 and surroundings thereof. The imaging device 10 obtains the image data D10 by imaging the traffic environment 1000. The imaging device 10 may be provided such that the imaging direction is fixed, or may be provided such that the imaging direction can be changed by a movable mechanism at the same position. As illustrated in FIG. 2, the image data D10 of the imaging device 10 is data that indicates an image D11 including a first area D110 indicating a plurality of the roads 1100 and a second area D120 indicating the traffic object 1200 passing on the road 1100.

The imaging device 10 supplies the image data obtained by imaging to the state estimation device 100. In the present embodiment, the image data includes, for example, two-dimensional images such as moving images and still images. The imaging device 10 of the present embodiment performs imaging at nighttime and in the daytime, obtains various image data by imaging, and supplies the obtained image data to the state estimation device 100. In the image data D10, a predetermined area D100 is preset to the image D11. The predetermined area D100 is an area including the traffic object 1200 that can be used for estimation, and can be appropriately set based on the traffic environment 1000 to be imaged. The predetermined area D100 may be the entire area of the image D11. The traffic object 1200 that can be used for estimation includes, for example, the traffic object 1200 used as a correct value for machine learning of a state estimation model M1. The traffic object 1200 that can be used for estimation is the traffic object 1200 that is suitable for estimation of the state estimation model M1.

As illustrated in FIG. 1, the state estimation device 100 may be provided near the imaging device 10 or may be provided at a position away from the imaging device 10. A case where the state estimation device 100 receives supply of the image data D10 from the one imaging device 10 will be described using the example illustrated in FIG. 1 for simplification of the description. However, the image data D10 may be supplied from each of the plurality of the imaging devices 10. The traffic object 1200 is moving on a lane toward the imaging device 10 along a road direction C1, and a road direction C2 indicates the direction of an oncoming lane.

The state estimation device 100 has a function of managing installation state parameters of the imaging device 10. The installation state parameters include, for example, an installation angle and an installation position of the imaging device 10. The installation state parameters may include, for example, the number of pixels of the imaging device 10 and the size of the image D11. By using a first state estimation model M1, a second state estimation model M2, and a feature estimation model M3 each subjected to machine learning by a learning device 200, the state estimation device 100 can estimate the installation state parameters of the imaging device 10 having obtained the image data D10 by imaging. The state estimation device 100 identifies whether imaging timing of a plurality of pieces of the image data D10 is at nighttime or in daytime (early morning), inputs image data at nighttime to the first state estimation model M1, inputs image data in daytime to the second state estimation model M2, outputs a feature amount of each of pieces of the image data, combines first feature amount data calculated using the first state estimation model M1 and second feature amount data calculated using the second state estimation model M2 to input them to the feature estimation model M3, and can estimate the output of the feature amount estimation model M3 as the installation state parameters of the imaging device 10.

The learning device 200 is, for example, a computer or a server device. The learning device 200 may or may not need to be included in the configuration of the system 1. The learning device 200 acquires a plurality of pieces of first teacher data each including the image data D10 obtained by imaging the traffic environment 1000 including the traffic object 1200, and correct value data D21 of the installation state parameters of the imaging device 10 having obtained the image data D10 by imaging. The correct value data D21 includes, for example, data indicating correct values of an installation angle (α, β, and γ), an installation position (x, y, and z), the number of pixels, and a size of the image D11 of the imaging device 10. The correct value data D21 is an example of first correct value data. The installation angle includes, for example, the pitch angle α in a direction in which the imaging device 10 looks down, the yaw angle β at which the imaging device 10 can laterally swing the imaging direction, and the roll angle γ in a direction in which the imaging device 10 tilts. The installation position has, for example, a position (x, z) and a height y on a road surface. The correct value data D21 may be, for example, a correct value obtained by combining two values of α and γ that enable identification of an orientation with respect to the road surface. The correct value data D21 may be, for example, a correct value obtained by combining three values of α, γ, and y that enable identification of a scale. The correct value data D21 may be, for example, a correct value obtained by combining four values of α, β, γ, and y that enable identification of a main road direction. The correct value data D21 may be, for example, a correct value obtained by combining six values of α, β, γ, x, y, and z used for general calibration.

The learning device 200 generates the first state estimation model M1, the second state estimation model M2, and the feature estimation model M3 by machine learning using a combination of a plurality of pieces of image data obtained by imaging from the same point and the installation state parameters. Pieces of the image data for the teacher data are classified into pieces of image data at nighttime and pieces of image data in daytime. The image data at nighttime includes information for specifying an area of the traffic object. The daytime image data is an image in which the number of the traffic objects is a threshold value or less and a road and fixed objects disposed around the road are included in the image. The teacher data includes image data including a traffic object at nighttime as first teacher data and image data at daytime as second teacher data.

The learning device 200 generates the first state estimation model M1 for estimating the first feature amount data from the input image data D10 by machine learning using a plurality of pieces of the first teacher data. The learning device 200 generates the second state estimation model M2 for estimating the second feature amount data from the input image data D10 by machine learning using a plurality of pieces of the second teacher data. The learning device 200 generates the feature estimation model M3 for estimating the installation state parameters of the imaging device 10 that has obtained an image from the first state estimation model M1 and the second state estimation model M2 by machine learning using data obtained by combining the first feature amount data and the second feature amount data.

For supervised machine learning, for example, an algorithm such as a neural network, linear regression, or logistic regression can be used. The first state estimation model M1 is a model obtained by performing machine learning on the image data of the plurality of pieces of teacher data and the correct value data D21 that is data of a feature amount of the traffic object included in the image data so as to estimate the first feature amount by the input image data D10. When receiving an input of the image data, the first state estimation model M1 estimates and outputs the first feature amount data including the feature amount of the traffic object included in the image data. The second state estimation model M2 is a model obtained by performing machine learning on the image data of the plurality of pieces of teacher data and the correct value data that is data of the feature amount of the traffic environment included in the image data such as a road other than the traffic object so as to estimate the second feature amount by the input image data D10. When receiving an input of the image data, the second state estimation model M2 estimates and outputs the second feature amount data including the feature amount of the traffic environment included in the image data other than the traffic object. The third feature estimation model M3 is a model obtained by performing machine learning on the feature amount data of the plurality of pieces of teacher data and the correct value data D22 that is data of the installation state parameters of the imaging device 10 having performed imaging so as to estimate the installation state parameters of the imaging device 10 having obtained the image data D10 by imaging by the data obtained by combining the first feature amount data and the second feature amount data, which have been input. When receiving an input of the data obtained by combining the first feature amount data and the second feature amount data, the feature estimation model M3 estimates the installation state parameters of the imaging device 10 having obtained the image data D10 by imaging, and outputs the estimation result. By providing the generated state estimation model M1, state estimation model M2, feature estimation model M3 to the state estimation device 100, the learning device 200 can contribute to making a dedicated tool or manual work unnecessary for the state estimation device 100 to calculate the installation state of the imaging device 10. An example of the learning device 200 will be described later.

The state estimation device 100 can input image data D to the first state estimation model M1 and the second state estimation model M2 each provided by the learning device 200, output the first feature amount data and the second feature amount data by using the first state estimation model M1 and the second state estimation model M2. respectively, input the feature amount data obtained by combining the first feature amount data and the second feature amount data to the feature estimation model M3, and estimate the installation state parameters by which the image data D10 has been obtained by imaging based on the output of the feature estimation model M3. The state estimation device 100 can diagnose the installation state of the imaging device 10 based on the estimated installation state parameters. Thus, the state estimation device 100 can eliminate the need for a dedicated jig or manual work for calculation of the installation state of the imaging device 10 at a time of installation of the imaging device 10 in the traffic environment 1000, at a time of maintenance of the imaging device 10, or the like. The state estimation device 100 can make traffic regulation unnecessary by making a jig or manual work unnecessary. As a result, the state estimation device 100 can contribute to spreading the use of the imaging devices 10 installed in the traffic environment 1000, and can improve efficiency of maintenance.

The learning device 200 can acquire a plurality of pieces of third teacher data including the image data D10 obtained by the imaging device 10 having imaged the traffic environment 1000 including the traffic object 1200, and correct value data D22 of object detection in the image data D10. The correct value data D22 includes, for example, data indicating correct values of a position, a size, a type, and the number of the traffic objects 1200 in the image D11. The correct value data D22 is an example of the second correct value data. The correct value data D22 includes, for example, a total of five pieces of data that includes two pieces of data of the position (x and y) of an object in the image D11, two pieces of data of the size (w and h) of the object, and one piece of data of an object type, and the number of which corresponds to the number of objects in the image D11. The object type includes, for example, a person, a large car, an ordinary car, a large special car, a large motorcycle, an ordinary motorcycle, a small special car, and a bicycle.

The learning device 200 generates an object estimation model M4 for estimating at least one selected from the group consisting of a position, a size, and a type of the traffic object 1200 (object) in the traffic environment 1000 indicated by the input image data D10 by machine learning using a plurality of pieces of the third teacher data. The object estimation model M4 is a model obtained by performing machine learning on the image data D10 of a plurality of pieces of teacher data and the correct value data D22 so as to estimate the position, the size, and the type of the traffic object 1200 in the traffic environment 1000 indicated by the input image data D10. When receiving an input of the image data D10, the object estimation model M2 estimates the position, the size, the type, and the number of the traffic objects 1200 in the traffic environment 1000 indicated by the image data D10, and outputs an estimation result. The learning device 200 can provide the generated object estimation model M4 to the state estimation device 100.

The state estimation device 100 has a function of performing processing such that the image data D10 obtained by the imaging device 10 having imaged the traffic environment 1000 includes the traffic object 1200 used for estimation. For example, the state estimation device 100 can perform processing such that the image data D10 obtained by the imaging device 10 having imaged the traffic environment 1000 includes the traffic object 1200 used for estimation using the object estimation model M4. Thus, the state estimation device 100 can input the image data D10 that can be used for estimation of the installation state parameters of the imaging device 10 to the state estimation model M1, and improve estimation accuracy of the state estimation model M1. The image data D10 that can be used for estimation of the installation state parameters of the imaging device 10 is data that can improve a probability of the estimation result of the state estimation model M1.

The system 1 can provide a function of managing maintenance of the one or more imaging devices 10 by using the estimation result of the state estimation device 100. The system 1 can provide a function of instructing change of the installation state of the imaging device 10 based on the installation state parameters and the installation position estimated by the state estimation device 100.

Learning Device

Figure 3:
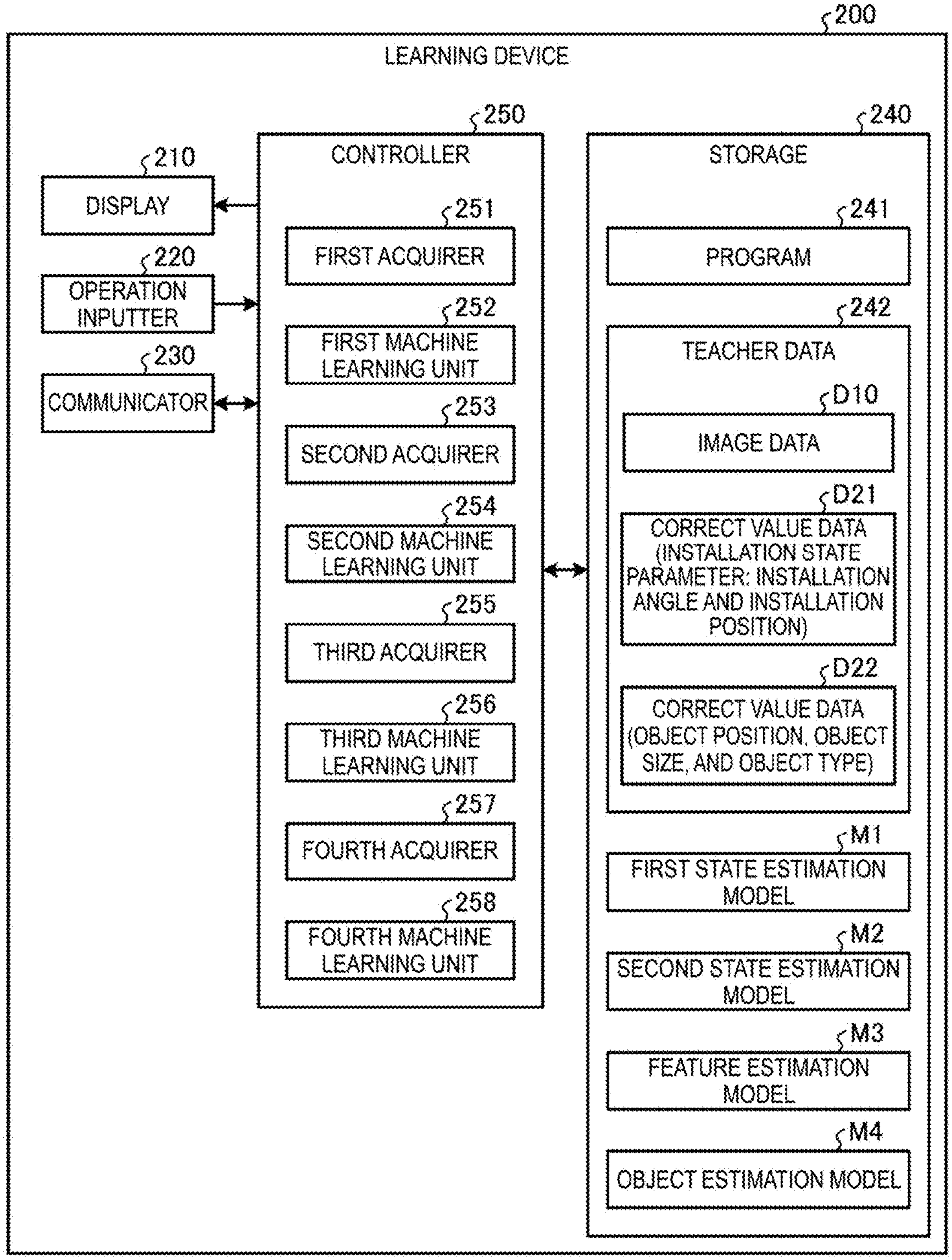
FIG. 3 is a diagram illustrating an example of a configuration of the learning device according to the embodiment.

FIG. 3 is a diagram illustrating an example of a configuration of the learning device 200 according to the embodiment. As illustrated in FIG. 3, the learning device 200 includes a display 210, an operation inputter 220, a communicator 230, a storage 240, and a controller 250. The controller 250 is electrically connected to the display 210, the operation inputter 220, the communicator 230, the storage 240, and the like. In the present embodiment, an example will be described where the learning device 200 executes machine learning using a Convolutional Neural Network (CNN) that is one of neural networks.

The display 210 is configured to display various types of information under the control of the controller 250. The display 210 includes a display panel such as a liquid crystal display and an organic EL display. The display 210 displays information such as a character, a diagram, and an image, in accordance with a signal input from the controller 250.

The operation inputter 220 includes one or more devices for receiving an operation of a user. The devices for receiving the operation of the user include, for example, a key, a button, a touch screen, and a mouse. The operation inputter 220 can supply a signal corresponding to a received operation to the controller 250.

The communicator 230 can communicate with, for example, the state estimation device 100 and other communication devices. The communicator 230 can support various communication standards. The communicator 230 can transmit and receive various types of data via, for example, a wired or wireless network. The communicator 230 can supply received data to the controller 250. The communicator 230 can transmit data to a transmission destination designated by the controller 250.

The storage 240 can store a program and data. The storage 240 is also used as a work area that temporarily stores a processing result of the controller 250. The storage 240 may include a freely selected non-transitory storage medium such as a semiconductor storage medium and a magnetic storage medium. The storage 240 may include a plurality of types of storage media. The storage 240 may include a combination of a portable storage medium such as a memory card, an optical disk, a magneto-optical disk, or the like and a device for reading a storage medium. The storage 240 may include a storage device used as a temporary storage area such as a Random Access Memory (RAM).

The storage 240 can store, for example, various types of data such as a program 241, teacher data 242, the first state estimation model M1, the second state estimation model M2, the feature estimation model M3, and the object estimation model M4. The program 241 causes the controller 250 to execute a function of generating using the CNN the state estimation model that estimates the installation state parameters of the imaging device 10 having obtained the image data D10 by imaging. The program 241 causes the controller 250 to execute a function of generating using the CNN the object estimation model that estimates information about an object indicated by the image data D10.

The teacher data 242 is learning data, training data, or the like used for machine learning. The teacher data 242 includes data obtained by combining the image data D10 used for machine learning of state estimation, and the correct value data D21 associated with the image data D10. The image data D10 is input data of supervised learning. For example, the image data D10 indicates a color image that is obtained by imaging the traffic environment 1000 including the traffic object 1200, and whose number of pixels is 1280×960. The correct value data D21 includes data indicating the installation state parameters of the imaging device 10 having obtained the image data D10 by imaging. The correct value data D21 is correct answer data of supervised machine learning. The correct value data D21 includes, for example, data indicating six parameters (values) of an installation angle (α, β, and γ) and an installation position (x, y, and z) of the imaging device 10.

The teacher data 242 further includes data obtained by combining the image data D10 used for machine learning of object estimation and the correct value data D22 associated with the image data D10. For example, the image data D10 indicates a color image that is obtained by imaging the traffic environment 1000 including the traffic object 1200, and whose number of pixels is 1280×960. The correct value data D22 includes data that indicates an object position, an object size, and an object type of the object (traffic object 1200) indicated by the image data D10, and the number of which corresponds to the number of the traffic objects 1200 (objects) included in the image. The object position includes, for example, coordinates (x, y) in the associated image data D10. The object size includes, for example, the width and the height of the object indicated by the associated image data D10.

Figure 4:
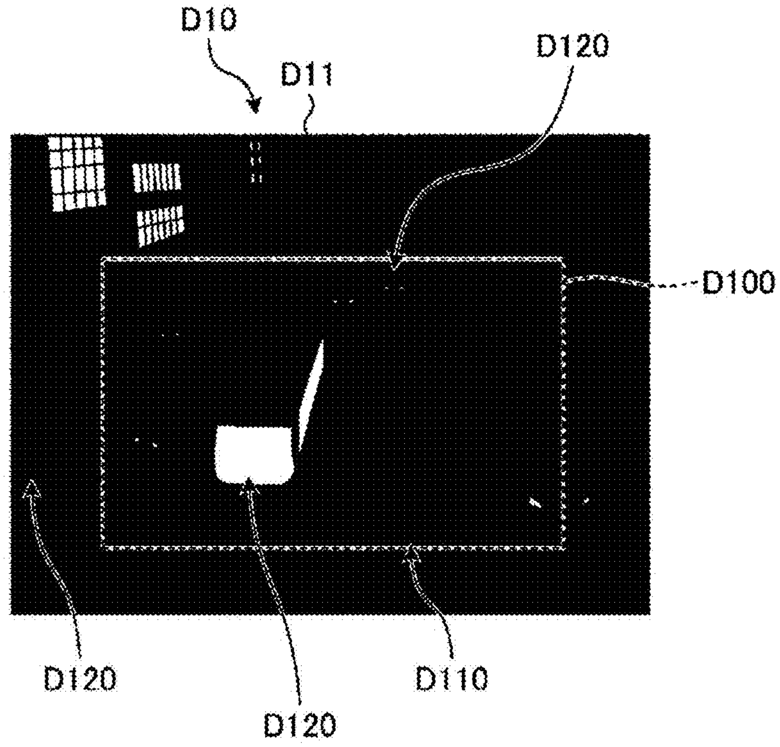
FIG. 4 is a diagram illustrating an example of image data at nighttime.
Figure 5:
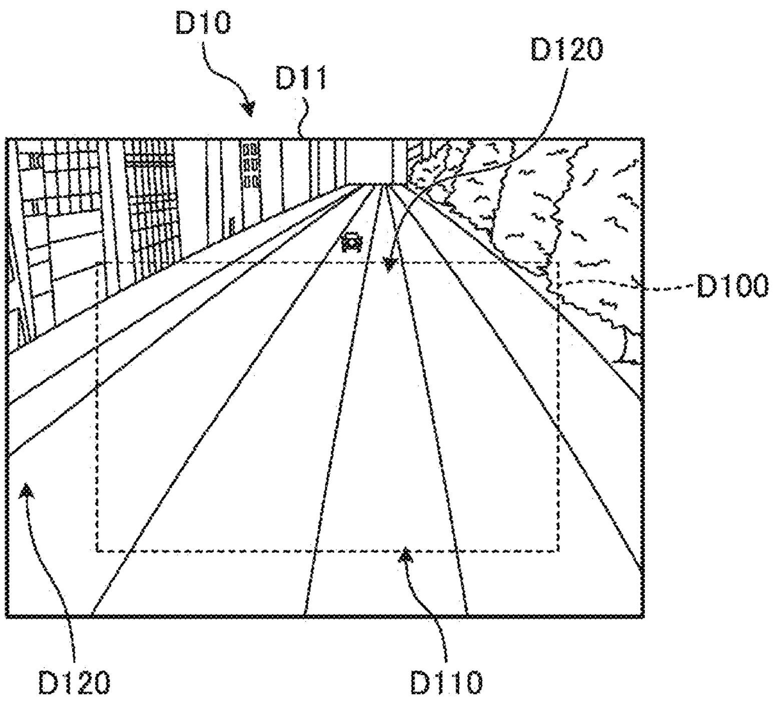
FIG. 5 is a diagram illustrating an example of image data in the early morning.

The image data D10 includes an image at nighttime and an image in the early morning. FIG. 4 is a diagram illustrating an example of the image data at nighttime. FIG. 5 is a diagram illustrating an example of the image data in the early morning. As illustrated in FIG. 4, the image data obtained by imaging at nighttime is an image in which a position of a lighting device such as a headlight of a vehicle, which is the traffic object, can be clearly extracted, and a traffic environment other than the traffic object that does not emit light, such as a lane of a road, cannot be easily identified. As illustrated in FIG. 5, the image data obtained by imaging in the early morning is an image in which the amount of traffic is small and there are few traffic objects, and is an image in which the traffic environment other than the traffic object can be easily identified.

The first state estimation model M1 is a learning model generated by extracting the features, regularity, patterns, and the like of the image data D10 by using image data (first image data) at nighttime among the image data D10 and the correct value data D21 each included in the teacher data 242, and performing machine learning on a relationship between the image and the feature amount corresponding to the correct value data D21. When receiving an input of the image data D10, the first state estimation model M1 predicts the teacher data 242 similar to the features or the like of the image data D10, estimates and outputs the first feature amount data. The second state estimation model M2 is a learning model generated by extracting the features, regularity, patterns, and the like of the image data D10 at nighttime among the image data D10 by using image data (second image data) in daytime among the image data D10 and the correct value data D21 each included in the teacher data 242, and performing machine learning on a relationship between the image and the feature amount corresponding to the correct value data D21. When receiving an input of the image data D10, the second state estimation model M2 predicts the teacher data 242 similar to the features or the like of the image data D10, estimates and outputs the second feature amount data. Here, the image data (second image data) in daytime is an image having a smaller number of moving objects than the image data (first image data) at nighttime, and the third feature estimation model M3 is a learning model generated by extracting features, regularity, patterns, and the like of the image data D10 by using the image data D10 and the correct value data D21 each included in the teacher data 242, and performing machine learning on a relationship between the feature amount of the image and the correct value data D21. When receiving an input of the data obtained by combining the first feature amount data and the second feature amount data, the third feature estimation model M3 predicts the teacher data 242 similar to the features or the like of the image data D10, estimates the installation state parameters of the imaging device 10 having obtained the image data D10 by imaging, and outputs the estimation result.

The object estimation model M4 is a learning model generated by extracting features, regularity, patterns, and the like of the object of the image data D10 by using the image data D10 and the correct value data D22 included in the teacher data 242, and performing machine learning on a relationship with the correct value data D22. When receiving an input of the image data D10, the object estimation model M4 predicts the teacher data 242 similar to the features or the like of the object of the image data D10, estimates the position, the size, the type, or the like of the object in the image indicated by the image data D10 based on the correct value data D22, and outputs the estimation result.

The controller 250 is an arithmetic processing device. Examples of the arithmetic processing device include, but are not limited to, a central processing unit (CPU), a system-on-a-chip (SoC), a micro control unit (MCU), a field-programmable gate array (FPGA), and a coprocessor. The controller 250 can comprehensively control the operation of the learning device 200 and implement various types of functions.

Specifically, the controller 250 can execute instructions included in the program 241 stored in the storage 240 while referring, as appropriate, to information stored in the storage 240. The controller 250 can control the functional units in accordance with the data and the instructions, thereby implementing various functions. The functional units include, but are not limited to, for example, the display 210 and the communicator 230.

The controller 250 includes functional units such as a first acquirer 251, a first machine learning unit 252, a second acquirer 253, a second machine learning unit 254, a third acquirer 255, a third machine learning unit 256, a fourth acquirer 257, and a fourth machine learning unit 258. The controller 250 implements the functions of the first acquirer 251, the first machine learning unit 252, the second acquirer 253, the second machine learning unit 254, the third acquirer 255, the third machine learning unit 256, the fourth acquirer 257, the fourth machine learning unit 258, and the like by executing the program 241. The program 241 is a program for causing the controller 250 of the learning device 200 to function as the first acquirer 251, the first machine learning unit 252, the second acquirer 253, the second machine learning unit 254, the third acquirer 255, the third machine learning unit 256, the fourth acquirer 257, and the fourth machine learning unit 258.

The first acquirer 251 acquires, as teacher data, the image data D10 obtained by imaging the traffic environment 1000 including the traffic object 1200, and the feature amount data corresponding to the correct value data D21 of the installation state parameters of the imaging device 10 having obtained the image data D10 by imaging. The first acquirer 251 acquires the image data at nighttime among the image data. The first acquirer 251 acquires the image data D10 and the feature amount data corresponding to the correct value data D21 from a preset storage destination, a storage destination selected by the operation inputter 220, or the like so as to be associated with the teacher data 242 in the storage 240 to store thereof. The first acquirer 251 acquires the plurality of pieces of image data D10 and the feature amount data corresponding to the correct value data D21 used for machine learning.

The first machine learning unit 252 generates the first state estimation model M1 that estimates the feature amount of the image data (first image data) by machine learning using the plurality of pieces of teacher data 242 (first teacher data) acquired by the first acquirer 251. The first machine learning unit 252 constructs the CNN based on, for example, the teacher data 242. The CNN is constructed as a network such that the CNN receives an input of the image data D10 and outputs an identification result for the image data D10. The identification result is feature amount data including the feature amount of the traffic object included in the image data D10.

The second acquirer 253 acquires, as teacher data, the image data D10 obtained by imaging the traffic environment 1000 and the feature amount data corresponding to the correct value data D21 of the installation state parameters of the imaging device 10 having obtained the image data D10 by imaging. The second acquirer 253 acquires image data in the daytime, particularly in the early morning, among the image data. The second acquirer 253 acquires the image data D10 and the feature amount data corresponding to the correct value data D21 from a preset storage destination, a storage destination selected by the operation inputter 220, or the like to associate with the teacher data 242 in the storage 240 to store thereof. The second acquirer 253 acquires the plurality of pieces of image data D10 and the feature amount data corresponding to the correct value data D21 used for machine learning.

The second machine learning unit 254 generates the second state estimation model M1 that estimates the feature amount of the image data (second image data) by machine learning using the plurality of pieces of teacher data 242 (second teacher data) acquired by the second acquirer 253. The second machine learning unit 252 constructs the CNN based on, for example, the teacher data 242. The CNN is constructed as a network such that the CNN receives an input of the image data D10 and outputs an identification result for the image data D10. The identification result is feature amount data including the feature amount of objects included in the image data D10, such as a road, a sign, a signal, and a fixed object on a side strip, other than the traffic object.

The third acquirer 255 acquires, as teacher data, the feature amount data acquired by the first machine learning unit 252 and the second machine learning unit 254 based on the image data D10 obtained by imaging the traffic environment 1000 including the traffic object 1200, and the feature amount data corresponding to the correct value data D21 of the installation state parameters of the imaging device 10 having obtained the image data D10 by imaging. The third acquirer 255 acquires the feature amount data and the correct value data D21 from a preset storage destination, a storage destination selected by the operation inputter 220, or the like to associate with the teacher data 242 in the storage 240 to store thereof. The third acquirer 255 acquires a plurality of pieces of the feature amount data and the correct value data D21 used for machine learning.

The third machine learning unit 256 generates the feature estimation model M3 that estimates the installation state parameters of the imaging device 10 having obtained the input image data D10 by imaging by machine learning using the plurality of pieces of teacher data 242 (feature amount data) acquired by the third acquirer 255. The third machine learning unit 256 constructs the CNN based on, for example, the teacher data 242. The CNN is constructed as a network such that the CNN receives an input of the feature amount data and outputs an identification result for the image data D10. The identification result includes information for estimating the installation state parameters of the imaging device 10 having obtained the image data D10 by imaging.

Figure 6:
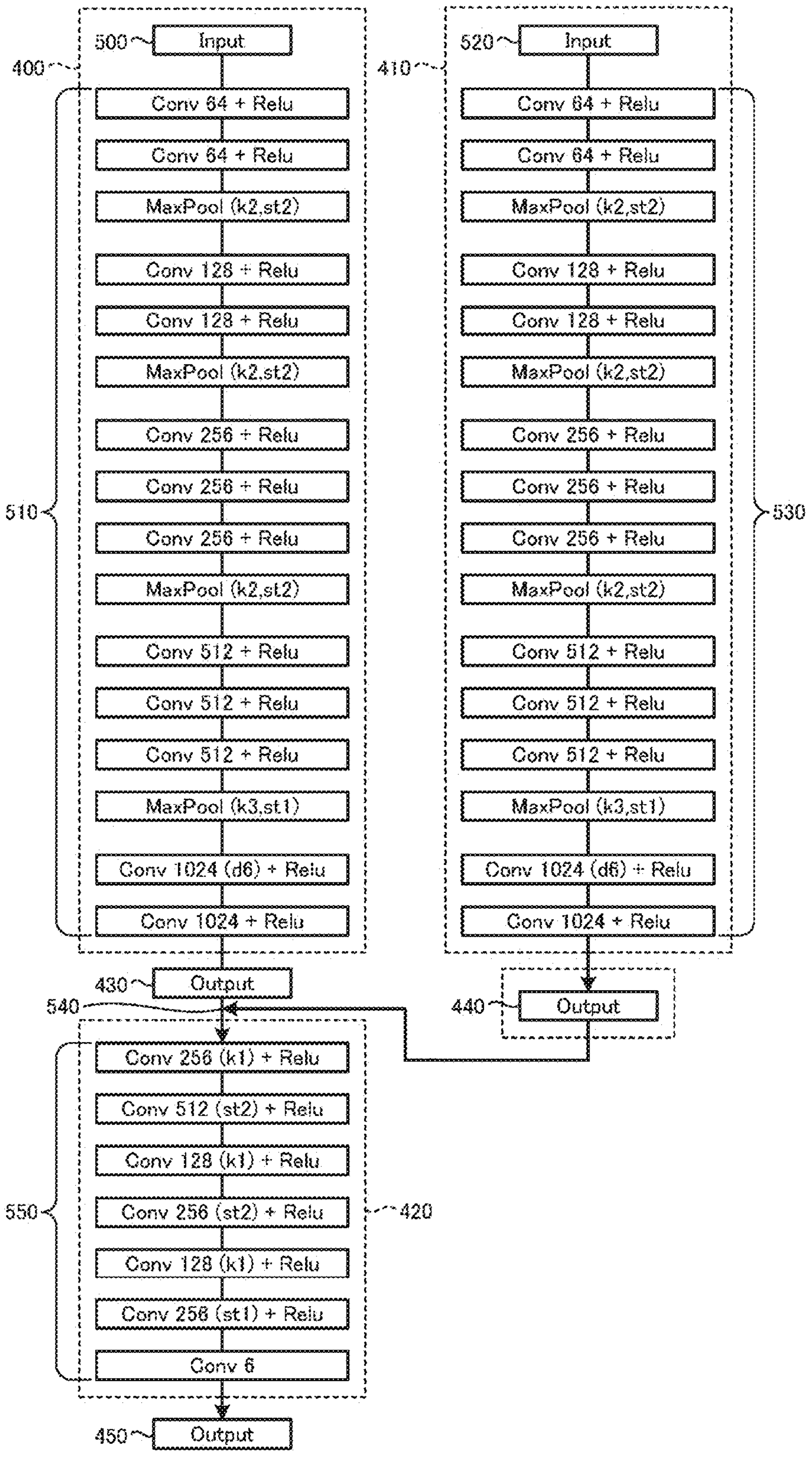
FIG. 6 is a diagram illustrating an example of a CNN used for state estimation by the learning device illustrated in FIG. 3.

FIG. 6 is a diagram illustrating an example of the CNN used for state estimation by the learning device 200 illustrated in FIG. 3. The first machine learning unit 252, the second machine learning unit 254, and the third machine learning unit 256 construct the CNN illustrated in FIG. 6 based on the acquired teacher data 242. In the present embodiment, the first machine learning unit 252, the second machine learning unit 254, and the third machine learning unit 256 each execute machine learning, and the learning results of the first machine learning unit 252 and the second machine learning unit 254 are supplied to the third machine learning unit 256. The learning in the first machine learning unit 252, the second machine learning unit 254, and the third machine learning unit 256 may be executed by separate processing, or may be executed as one learning. The feature amount data respectively serving as correct answer data of the first machine learning unit 252 and the second machine learning unit 254 can be generated by various methods. As is known, the CNN includes an input layer, an intermediate layer, and an output layer.

As illustrated in FIG. 6, the learning device 200 includes a first learning unit 400, a second learning unit 410, a third learning unit 420, and output layers 430, 440, and 450. The first learning unit 400 executes the processing of the first machine learning unit 252. The first learning unit 400 includes an input layer 500 and an intermediate layer 510, and outputs a result processed by the intermediate layer 510 to the output layer 430. The input layer 500 receives image data obtained by imaging at nighttime among the image data. The input layer 500 outputs the input data to the intermediate layer 510. The input image data D10 indicates, for example, data indicating a color image of 640×640×3.

The intermediate layer 510 includes a plurality of feature extraction layers and a connected layer. Each of the plurality of feature extraction layers extracts a different feature of the image D11 indicated by the image data D10. The features of the image D11 to be extracted include for example, features related to the traffic object in the image. The feature extraction layer includes, for example, one or more convolution layers and a pooling layer, and extracts desired features from the input image data D10. The convolution layer of the feature extraction layer is a layer that extracts a portion of the image D11 that resembles the shape of a filter (weight) by performing a convolution operation on the input data. The convolution layer is configured to apply the activation function to the feature map that is an operation result. In the present embodiment, a Rectified linear unit (Relu) function is applied as the activation function. However, a sigmoid function or the like may be applied. The pooling layer of the feature extraction layer performs processing of summarizing the features of the image data D10 obtained by convolution into a maximum value or an average value, and thereby regarding the features as the same features even when the positions of the extracted features vary. The feature extraction layer 2210 can extract more sophisticated and complex features by increasing the numbers of convolution layers and pooling layers to learn an optimum output to be obtained. The connected layer connects the features extracted by the plurality of feature extraction layers to output to the output layer 430. The intermediate layer 510 outputs data indicating the feature amount to the output layer 430.

The second learning unit 410 executes the processing of the second machine learning unit 254. The second learning unit 410 includes an input layer 520 and an intermediate layer 530, and outputs a result processed by the intermediate layer 530 to an output layer 440. The input layer 520 receives image data obtained by imaging in the early morning and in daytime among the image data. The input layer 520 outputs the input data to the intermediate layer 530. The input image data D10 indicates, for example, data indicating a color image of 640×640×3.

The intermediate layer 530 includes a plurality of feature extraction layers and a connected layer. Each of the plurality of feature extraction layers extracts a different feature of the image D11 indicated by the image data D10. The features of the image D11 to be extracted include for example, features related to the traffic environment other than the traffic object in the image. The feature extraction layer includes, for example, one or more convolution layers and a pooling layer, and extracts desired features from the input image data D10. The convolution layer of the feature extraction layer is a layer that extracts a portion of the image D11 that resembles the shape of a filter (weight) by performing a convolution operation on the input data. The convolution layer is configured to apply the activation function to the feature map that is an operation result. In the present embodiment, a Rectified linear unit (Relu) function is applied as the activation function. However, a sigmoid function or the like may be applied. The pooling layer of the feature extraction layer performs processing of summarizing the features of the image data D10 obtained by convolution into a maximum value or an average value, and thereby regarding the features as the same features even when the positions of the extracted features vary. The feature extraction layer 2210 can extract more sophisticated and complex features by increasing the numbers of convolution layers and pooling layers to learn an optimum output to be obtained. The connected layer connects the features extracted by the plurality of feature extraction layers to output to the output layer 440. The intermediate layer 530 outputs data indicating the feature amount to the output layer 440. The second learning unit 410 outputs data having the same data format as the first learning unit 400, that is, data in which the number of pixels of the feature amount data is the same.

In the learning device 200, a combiner 540 combines the feature amount data output from the output layer 430 and the feature amount data output from the output layer 440. The combiner 540 selects feature amount data of one image from the feature amount data of the plurality of images output by the output layer 430, selects feature amount data of one image from the feature amount data of the plurality of images output by the output layer 440, and combines them to generate one piece of feature amount data. The combiner 540 performs combining processing for the number of images of the feature amount data output by the output layer 430 and the output layer 440, and generates feature amount data of a predetermined number of images. Note that a method of selecting image by the combiner 540 is not particularly limited. Alternatively, one piece of image data may be used a plurality of times.

The third learning unit 420 executes the processing of the third machine learning unit 256. The third learning unit 420 includes the intermediate layer 530, and outputs a result processed by the intermediate layer 550 to an output layer 450. The feature amount data combined by the combiner 540 is supplied to the intermediate layer 530.

The intermediate layer 530 includes the plurality of feature extraction layers and the connected layer. Each of the plurality of feature extraction layers extracts a different feature of the image D11 indicated by the image data D10 included in the feature amount data. The feature extraction layer includes, for example, one or more convolution layers, and extracts desired features from the input image data D10. The convolution layer of the feature extraction layer is a layer that extracts a portion of the image D11 that resembles the shape of a filter (weight) by performing a convolution operation on the input data. The convolution layer is configured to apply the activation function to the feature map that is an operation result. In the present embodiment, a Rectified linear unit (Relu) function is applied as the activation function. However, a sigmoid function or the like may be applied. The pooling layer of the feature extraction layer performs processing of summarizing the features of the image data D10 obtained by convolution into a maximum value or an average value, and thereby regarding the features as the same features even when the positions of the extracted features vary. The feature extraction layer 2210 can extract more sophisticated and complex features by increasing the numbers of convolution layers and pooling layers to learn an optimum output to be obtained. The connected layer connects the features extracted by the plurality of feature extraction layers to output to the output layer 450.

The output layer 450 estimates the installation state parameters of the imaging device 10 having obtained the image data D10 by imaging based on the features extracted by the intermediate layer 550 and the correct value data D21. The output layer 450 specifies the correct value data D21 associated with the features similar to the features outputted by the connected layer, and outputs the installation state parameters indicated by the correct value data D21.

By performing machine learning using the plurality of pieces of teacher data 242, the first machine learning unit 252, the second machine learning unit 254, and the third machine learning unit 256 each determine weights and the like of the intermediate layer, set the weights to the CNN, and generate the first state estimation model M1, the second state estimation model M2, and the feature estimation model M3, respectively, to estimate the installation state parameters of the imaging device 10 having obtained the input image data D10 by imaging. The first machine learning unit 252, the second machine learning unit 254, and the third machine learning unit 256 store the generated first state estimation model M1, second state estimation model M2, and feature estimation model M3, respectively, in the storage 240. Thus, when receiving an input of the image data D10, the first state estimation model M1 can output the feature amount data of the image data. When receiving an input of the image data D10, the second state estimation model M2 can output the feature amount data of the image data. When receiving an input of the data obtained by combining pieces of the feature amount data, the feature estimation model M3 can output a result obtained by estimating the installation state parameters of the imaging device 10 having obtained the image data D10 by imaging.

The fourth acquirer 257 illustrated in FIG. 3 acquires, as the teacher data 242, the image data D10 obtained by the imaging device 10 having imaged the traffic environment 1000 including the traffic object 1200, and the correct value data D22 of object detection in the image data D10. The second acquirer 253 acquires the image data D10 and the correct value data D22 from a preset storage destination, a storage destination selected by the operation inputter 220, or the like to associate with the teacher data 242 in the storage 240 to store thereof. The fourth acquirer 257 acquires the plurality of pieces of image data D10 and the correct value data D22 used for machine learning.

The fourth machine learning unit 258 generates the object estimation model M2 that estimates at least one selected from the group consisting of the position, the size, and the type of the traffic object 1200 in the traffic environment 1000 indicated by the input image data D10 by machine learning that uses the teacher data 242 (fourth teacher data). The fourth machine learning unit 258 constructs a CNN that supports detection of the traffic object 1200 (object) based on, for example, the teacher data 242. The CNN is constructed as a network that receives an input of the image data D10 and outputs an estimation result obtained by estimating the position, the size, and the type of the traffic object 1200 in the traffic environment 1000 indicated by the image data D10. The identification result includes the position, the size, and the type of the traffic object 1200 indicated by the image data D10.

Figure 7:
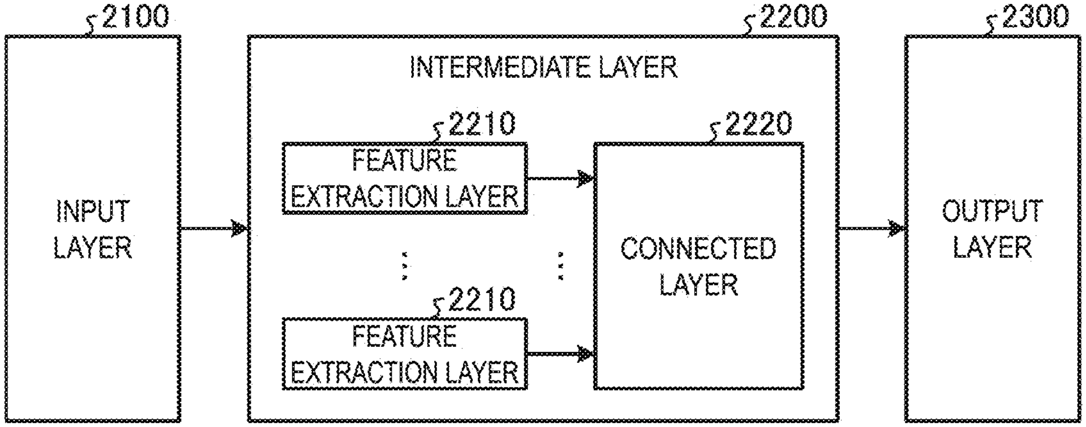
FIG. 7 is a diagram illustrating an example of a CNN used for object detection by the learning device illustrated in FIG. 3.

The fourth machine learning unit 258 constructs the CNN illustrated in FIG. 7 based on the acquired teacher data 242. The CNN includes the input layer 2100, the intermediate layer 2200, and the output layer 2300. The input layer 2100 can supply the input image data D10 to the intermediate layer 2200. The input image data D10 indicates, for example, data indicating a color image of 640×640×3. The intermediate layer 2200 includes the plurality of feature extraction layers 2210 and the connected layer 2220. The feature extraction layer 2210 extracts the traffic object 1200 (features) in the image indicated by the image data D10. The feature extraction layer 2210 includes, for example, the plurality of convolution layers and the pooling layer, and extracts the traffic object 1200 as features from the input image data D10. By performing a convolution operation on the input data, the convolution layer of the feature extraction layer 2210 extracts a portion of the image D11 that resembles the shape of the filter (weight). The convolution layer is configured to apply the activation function to the feature map that is an operation result. The pooling layer of the feature extraction layer 2210 performs processing of summarizing the features of the image data D10 obtained by convolution into a maximum value or an average value, and thereby regarding the features as the same features even when the positions of the extracted features vary. The feature extraction layer 2210 can extract more sophisticated and complex features by increasing the numbers of convolution layers and pooling layers to learn an optimum output to be obtained. The connected layer 2220 connects the features extracted by the plurality of feature extraction layers 2210 to output to the output layer 2300.

The output layer 2300 estimates the traffic object 1200 in the image indicated by the image data D10 based on the features extracted by the intermediate layer 2200 and the correct value data D22. The output layer 2300 specifies the correct value data D22 associated with the features similar to the features outputted by the fully-connected layer 2220, and outputs the position, the size, and the type of the traffic object 1200 indicated by the correct value data D22 and the estimated number of the traffic objects 1200.

By performing machine learning using the plurality of pieces of teacher data 242 (fourth teacher data) acquired by the fourth acquirer 257, the fourth machine learning unit 258 determines weights and the like of the intermediate layer 2200, sets the weights to the CNN, and generates the object estimation model M2 to estimate the traffic object 1200 in the image D11 indicated by the input image data D10. The fourth machine learning unit 258 stores the generated object estimation model M2 in the storage 240. Thus, when receiving an input of the image data D10, the object estimation model M4 can output results that indicate the position, the size, and the type of the traffic object 1200 indicated by the image data D10, and the number of which corresponds to the number of the estimated traffic objects 1200.

The functional configuration example of the learning device 200 according to the present embodiment has been described above. Note that the above configuration described with reference to FIG. 3 is merely an example, and the functional configuration of the learning device 200 according to the present embodiment is not limited to the example. The functional configuration of the learning device

200 according to the present embodiment can be flexibly changed in accordance with specifications and operations.

State Estimation Device

Figure 8:
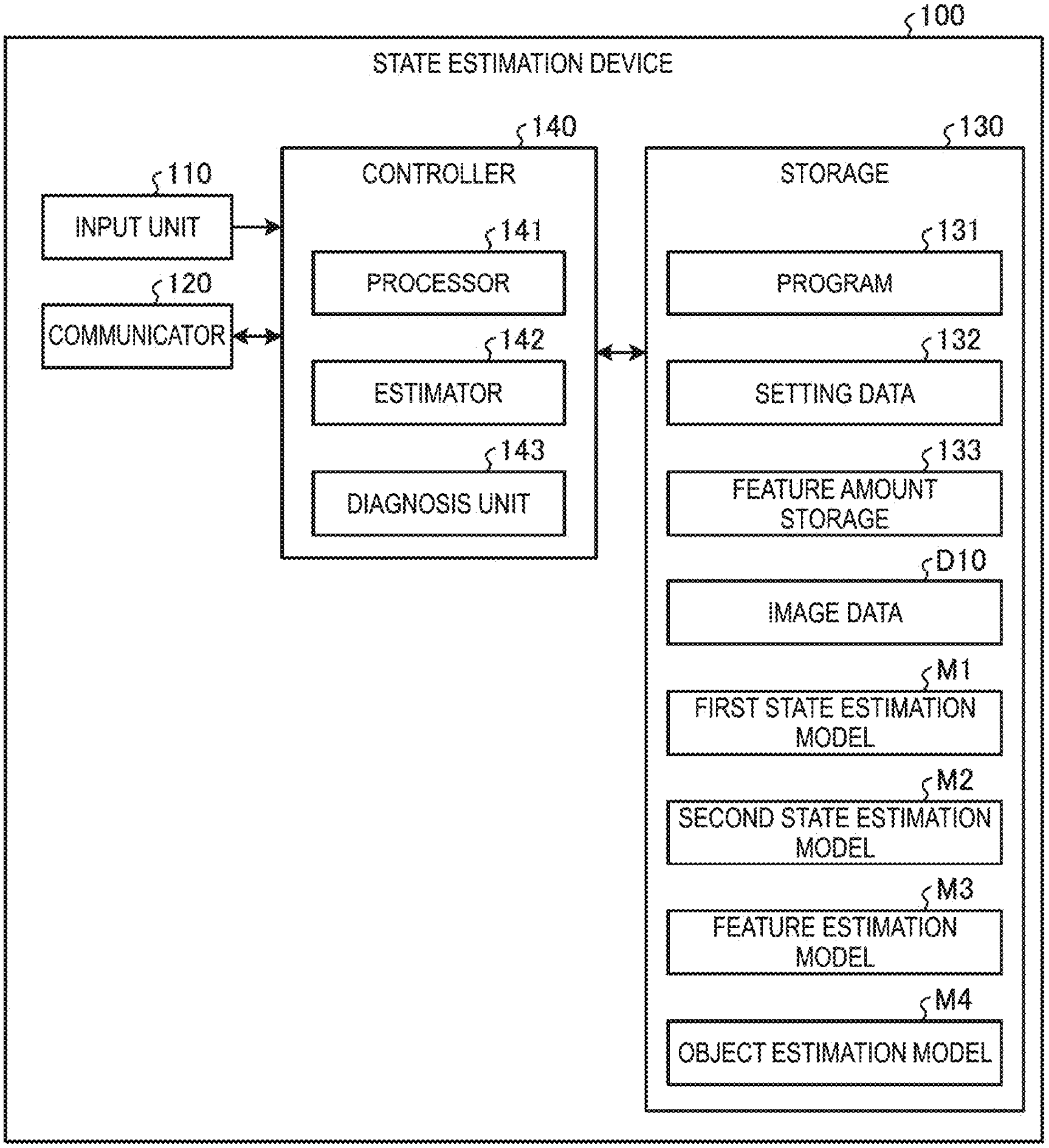
FIG. 8 is a diagram illustrating an example of a configuration of the state estimation device according to the embodiment.
Figure 9:
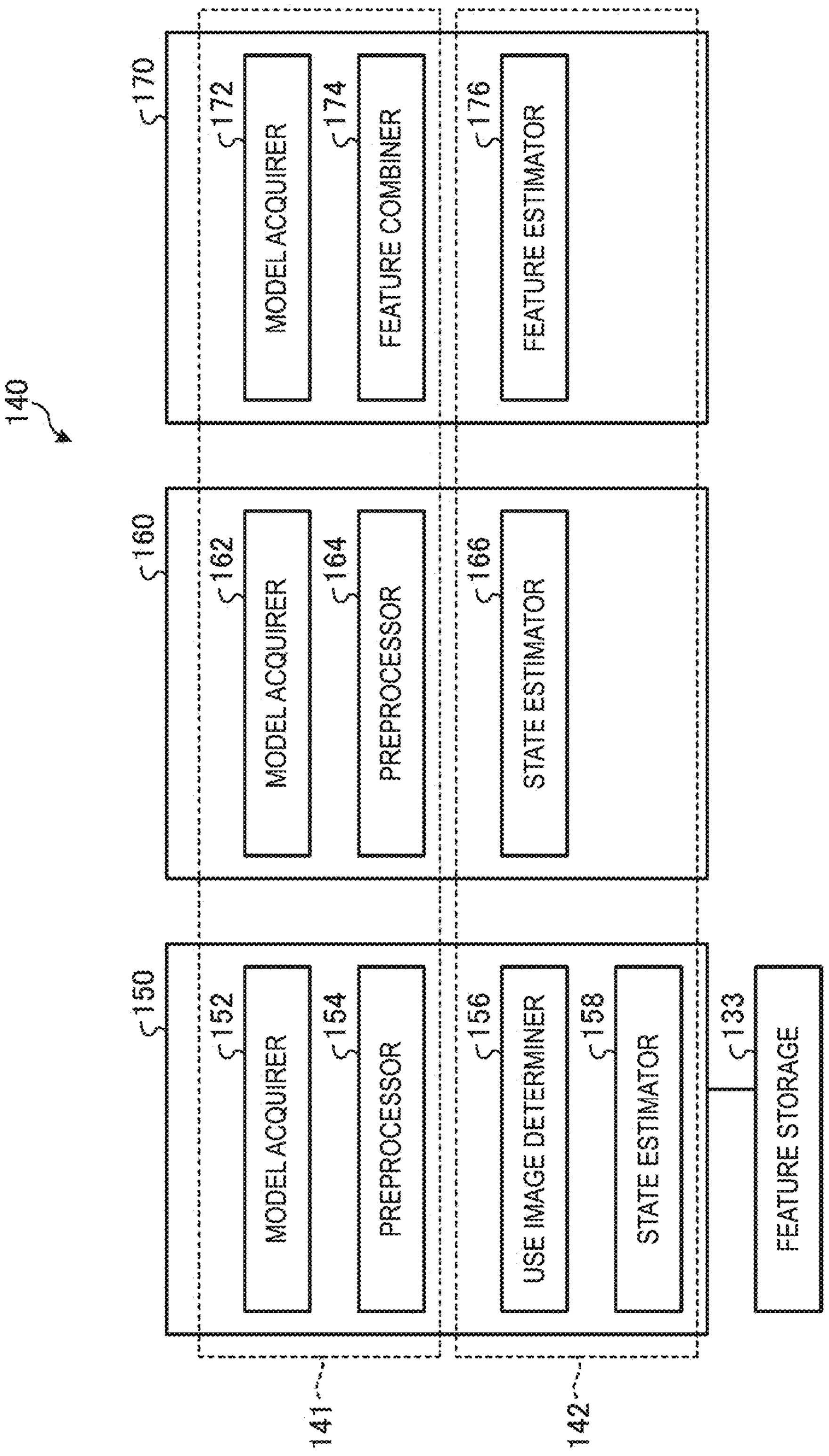
FIG. 9 is a diagram illustrating an example of a configuration of a controller of the state estimation device according to the embodiment.

FIG. 8 is a diagram illustrating an example of a configuration of the state estimation device 100 according to the embodiment. FIG. 9 is a diagram illustrating an example of a configuration of a controller of the state estimation device according to the embodiment. As illustrated in FIG. 8, the state estimation device 100 includes an input unit 110, a communicator 120, a storage 130, and a controller 140. The controller 140 is electrically connected to the input unit 110, the communicator 120, the storage 130, and the like.

The input unit 110 receives an input of the image data D10 imaged by the imaging device 10. The input unit 110 includes, for example, a connector that can be electrically connected with the imaging device 10 via a cable. The input unit 110 supplies to the controller 140 the image data D10 input from the imaging device 10.

The communicator 120 can communicate with, for example, a management device that manages the learning device 200 and the imaging device 10, and the like. The communicator 120 can support various communication standards. The communicator 120 can transmit and receive various types of information via, for example, a wired or wireless network. The communicator 120 can supply received data to the controller 140. The communicator 120 can transmit data to a transmission destination designated by the controller 140.

The storage 130 can store a program and data. The storage 130 is also used as a work area that temporarily stores a processing result of the controller 140. The storage 130 may include a freely selected non-transitory storage medium such as a semiconductor storage medium and a magnetic storage medium. The storage 130 may include a plurality of types of storage media. The storage 130 may include a combination of a portable storage medium such as a memory card, an optical disk, a magneto-optical disk, or the like and a device for reading a storage medium. The storage 130 may include a storage device used as a temporary storage area such as a RAM.

The storage 130 can store, for example, a program 131, setting data 132, feature amount data (feature amount storage) 133, the image data D10, the state estimation model M1, the object estimation model M2, and the like. The program 131 can cause the controller 140 to execute functions related to various types of control for operating the state estimation device 100. The setting data 132 includes data such as various settings related to the operation of the state estimation device 100, and settings related to the installation state of the management target imaging device 10. The feature amount data 133 includes data of a feature amount calculated at the time of processing the plurality of pieces of image data D10. The storage 130 can also store the plurality of image data D10 in chronological order. The first state estimation model M1, the second state estimation model M2, the feature estimation model M3, and the object estimation model M4 are the machine learning models generated by the learning device 200.

The controller 140 is an arithmetic processing device. The arithmetic processing device includes, but is not limited to, for example, a CPU, an SoC, an MCU, an FPGA, and a coprocessor. The controller 140 comprehensively controls the operation of the state estimation device 100 and implements various types of functions.

More specifically, the controller 140 executes an instruction included in the program 131 stored in the storage 130 while referring, as appropriate, to data stored in the storage 130. The controller 140 controls the functional units in accordance with the data and the instructions, and implements the various types of functions. The functional units include, but are not limited to, for example, the input unit 110 and the communicator 120.

The controller 140 includes functional units such as a processor 141, an estimator 142, and a diagnosis unit 143. The controller 140 implements the functional units such as the processor 141, the estimator 142, and the diagnosis unit 143 by executing the program 131. The program 131 is a program for causing the controller 140 of the state estimation device 100 to function as the processor 141, the estimator 142, and the diagnosis unit 143. As illustrated in FIG. 8, a first processing unit 150, a second processing unit 160, and a third processing unit 170 execute processing of each of the processor 141 and the estimator 142. The first processing unit 150 includes a model acquirer 152 and a preprocessor 154 included in the processor 141, and a use image determiner 156 and a state estimator 158 included in the estimator 142. The second processing unit 160 includes a model acquirer 162 and a preprocessor 164 included in the processor 141, and a state estimator 166 included in the estimator 142. The third processing unit 170 includes a model acquirer 172 and a feature combiner 174 included in the processor 141, and a feature estimator 176 included in the estimator 142.

The processor 141 acquires a model used by the estimator 142. The model acquirer 152 acquires the first state estimation model M1 and the object estimation model M4. The model acquirer 162 acquires the second state estimation model M2. The model acquirer 172 acquires the feature estimation model M3.

The processor 141 acquires the image data D10 imaged by the imaging device 10. The processor 141 performs preprocessing of the image data D10 used by the estimator 142, and supplies the image data D10 subjected to the preprocessing to the estimator 142. The preprocessor 154 executes various processing on the acquired image data. The preprocessor 154 extracts the traffic object included in the acquired image data by using the object estimation model M2. The preprocessor 154 may process the image data D10 such that the traffic object 1200 that can be used for estimation of the installation state of the imaging device 10 is included in the image. The traffic object 1200 that can be used for estimation includes a vehicle or the like that have appropriate looks for estimation of the installation state parameters. The traffic objects 1200 that can be used for estimation include, for example, vehicles or persons that exist in a predetermined area D100 of the image D11, and vehicles or persons that are heading toward the imaging device 10. In the present embodiment, the predetermined area D100 includes, for example, a preset area in the image D11 or a central area of the image D11. Examples of the traffic objects 1200 that are not suitable for estimation include large vehicles such as trucks, passenger cars, and construction machines that exist in the predetermined area D100 of the image D11 indicated by the image data D10. The processor 141 processes the image data D10 such that the image data D10 includes the traffic object 1200 that exists in the predetermined area D100 and/or the traffic object 1200 that faces the front with respect to the imaging device 10. The processor 141 may have a function of processing the image data D10 to delete or change from the image D11 the traffic object 1200 that is unnecessary for estimation of the installation state parameters of the imaging device 10.

The preprocessor 164 executes various processing on the acquired image data. The preprocessor 164 extracts the traffic objects included in the acquired image data by using the object estimation model M2 to select the traffic objects as image data to be used when the number of the traffic objects is the threshold value or less. The preprocessor 164 may perform processing for improving the accuracy of specifying the traffic environment, such as luminance adjustment and edge detection.

The feature combiner 174 combines pieces of the feature amount data processed by the first processing unit 150 and the second processing unit 160, each stored in the feature storage 133. The feature combiner 174 supplies the data of the combined feature amount to the feature estimator 176.

The estimator 142 performs estimation processing using the first state estimation model M1, the second state estimation model M2, and the feature estimation model M3 each generated by the learning device 200. The use image determiner 156 selects image data used for the estimation processing from the image data processed by the preprocessor 154. The use image determiner 156 selects a set number of image data based on a criterion such as the traffic object extracted using the object estimation model M4 being an image having a predetermined size or more or an image having a high estimation angle. The state estimator 158 inputs the image data processed by the preprocessor 154 and determined to be used by the use image determiner 156 to the first state estimation model M1, and estimates and outputs feature amount data (first feature amount data). The state estimator 166 inputs the image data processed by the preprocessor 164 to the second state estimation model M2, and estimates and outputs the feature amount data (second feature amount data). The feature estimator 176 inputs the data obtained by combining the feature amounts by the feature combiner 174 to the feature estimation model M3, and estimates the installation state parameters of the imaging device 10 based on the output of the feature estimation model M3.

The diagnosis unit 143 can provide a function of diagnosing the installation state of the imaging device 10 based on the installation state parameters estimated by the estimator 142. The diagnosis unit 143 can diagnose whether the estimation result of the installation state parameters is appropriate. The diagnosis unit 143 can diagnose the installation state of the imaging device 10 based on the installation state parameters estimated by the estimator 142 and the bird's-eye view state of the traffic object 1200 indicated by the image data D10. The diagnosis unit 143 can compare the orientation of the traffic object 1200 indicated by the image data D10 and the orientation of the traffic object 1200 calculated based on the installation state parameters estimated by the estimator 142, and diagnose the installation state of the imaging device 10 when the degree of coincidence is higher than a determination threshold value. The diagnosis unit 143 can compare the installation state parameters estimated by the estimator 142 and preset installation state parameters, and diagnose the installation state of the imaging device 10 based on a comparison result.

The controller 140 can provide a function of supplying the installation state parameters estimated by the estimator 142, a diagnosis result of the diagnosis unit 143, and the like to an external device, a database, and the like. For example, the controller 140 performs control of supplying the installation state parameters estimated by the estimator 142, the diagnosis result of the diagnosis unit 143, and the like via the communicator 120.

The functional configuration example of the state estimation device 100 according to the present embodiment has been described above. Note that the above configuration described with reference to FIG. 8 is merely an example, and the functional configuration of the state estimation device 100 according to the present embodiment is not limited to the example. The functional configuration of the state estimation device 100 according to the present embodiment can be flexibly changed in accordance with specifications and operations.

In the present embodiment, a case will be described where in the state estimation device 100, the controller 140 functions as the processor 141, the estimator 142, and the diagnosis unit 143. However, for example, the controller 140 may include the estimator 142 and the diagnosis unit 143, and may not need to include the processor 141. In this case, the state estimation device 100 may input the image data D10 to the state estimation model M1 without performing preprocessing of the image data D10 imaged by the imaging device 10. In the system 1, the processor 141 of the state estimation device 100 may employ the configuration of the imaging device 10.

Figure 10:
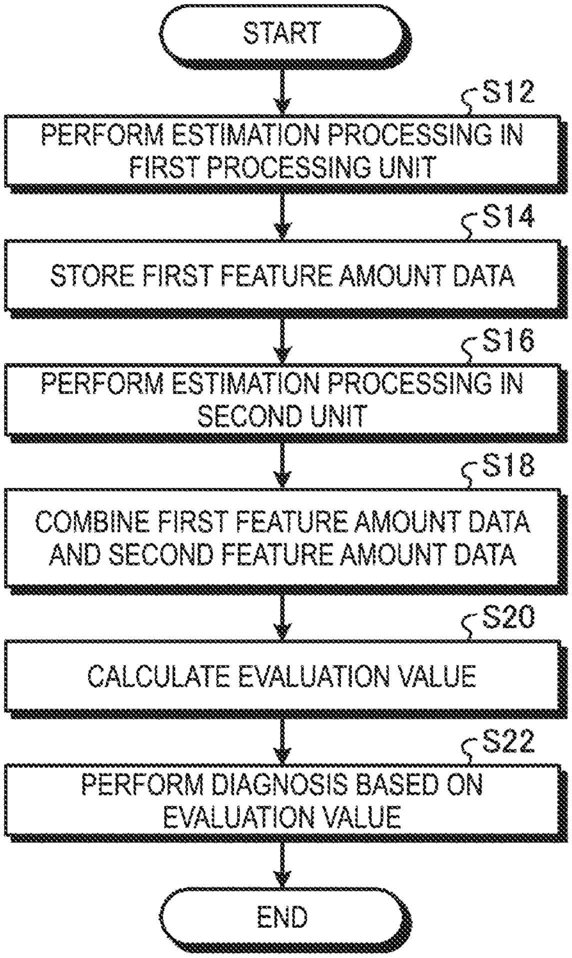
FIG. 10 is a flowchart illustrating an example of a state estimation method executed by the state estimation device.

FIG. 10 is a flowchart illustrating an example of the state estimation method executed by the state estimation device 100. The state estimation device 100 executes the method illustrated in FIG. 10 at an execution timing such as, for example, a time at installation of the imaging device 10, a time of maintenance, or a time at which execution is instructed from the outside. For example, after installation and maintenance are performed at nighttime, the state estimation device 100 acquires image data from nighttime to early morning and executes processing illustrated in FIG. 10. Note that the image data may be acquired for processing from daytime to nighttime.

Figure 11:
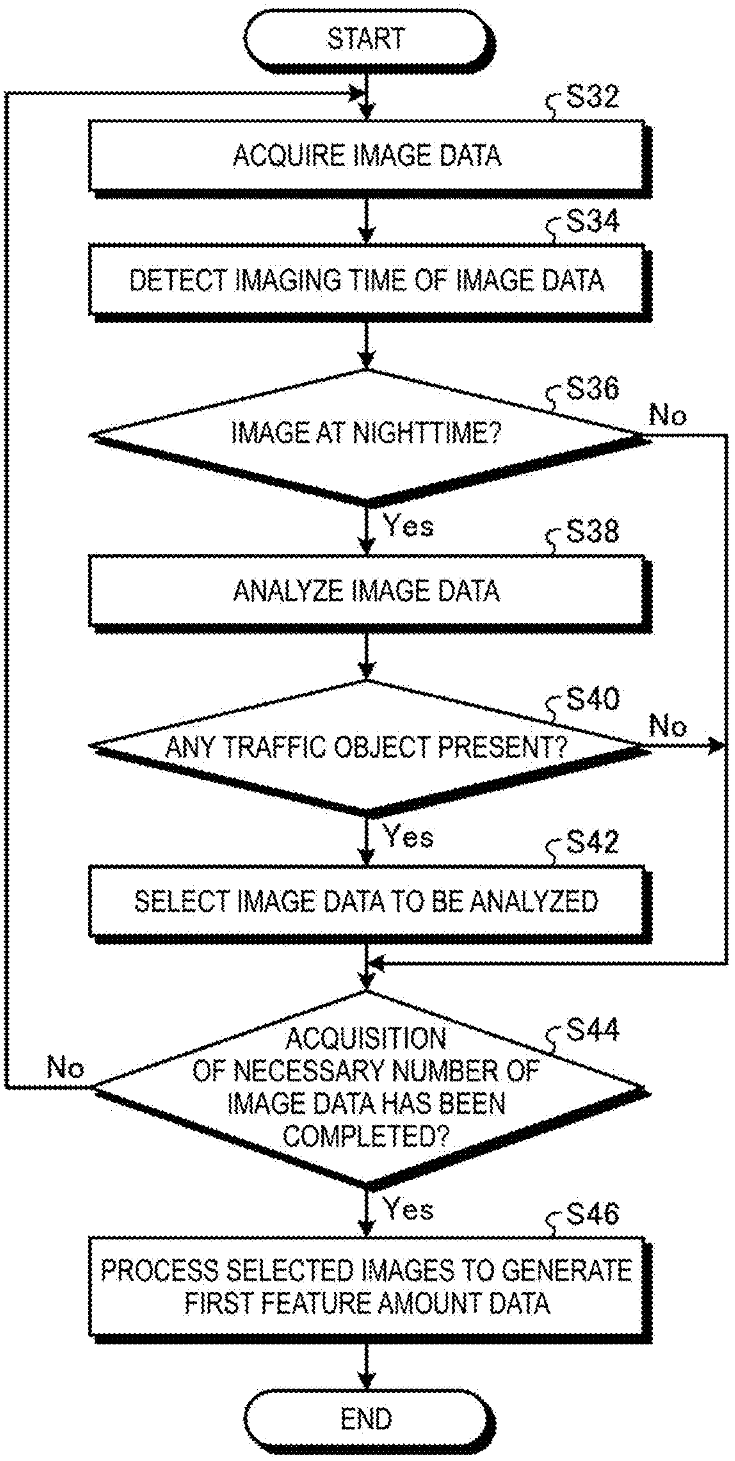
FIG. 11 is a flowchart illustrating an example of a state estimation method executed by a first processing unit.

The state estimation device 100 executes estimation processing in the first processing unit (step S12). FIG. 11 is a flowchart illustrating an example of a state estimation method executed by the first processing unit. The first processing unit 150 acquires image data (step S32). The first processing unit 150 detects imaging time of the image data (step S34). The first processing unit 150 may acquire the imaging time from the imaging device 10 or may perform image analysis to acquire the imaging time from the luminance and illuminance of the image. The first processing unit 150 determines whether the image is an image at nighttime (step S36). If the first processing unit 150 determines that the image is not the image at nighttime (No in step S36), then the process proceeds to step S44.

If the first processing unit 150 determines that the image is the image at nighttime (first image data) (Yes in step S36), then the first processing unit 150 analyzes the image data (step S38). Specifically, the first processing unit 150 detects the traffic object by using the object estimation model M4. The first processing unit 150 determines whether there is the traffic object (step S40). A determination criterion is not limited to the presence or absence of the traffic object, and may be based on whether the number of the traffic objects is the threshold value or more, or the size and position of the detected traffic object. If the first processing unit 150 determines that there is no traffic object (No in step S40), then the process proceeds to step S44. If the first processing unit 150 determines that there is a traffic object (Yes in step S40), then the first processing unit 150 selects the image data to be analyzed (step S42).

If the first processing unit 150 determines No in step S36, determines No in step S40, or executes the processing in step S42, then the first processing unit 150 determines whether acquisition of a necessary number of image data has been completed (step S44).

If the first processing unit 150 determines that the acquisition of the necessary number of image data has not been completed (No in step S44), then the process returns to step S32. Thus, the first processing unit 150 repeats the processing from step S32 to step S44 until the necessary number of image data are acquired.

If the first processing unit 150 determines that the acquisition of the necessary number of image data has been completed (Yes in Step S44), then the first processing unit 150 processes the selected image data to generate the first feature amount data (step S46). The first processing unit 150 inputs the selected image data to the first state estimation model M1, estimates the feature amount data, and outputs the estimated feature amount data.

Figure 12:
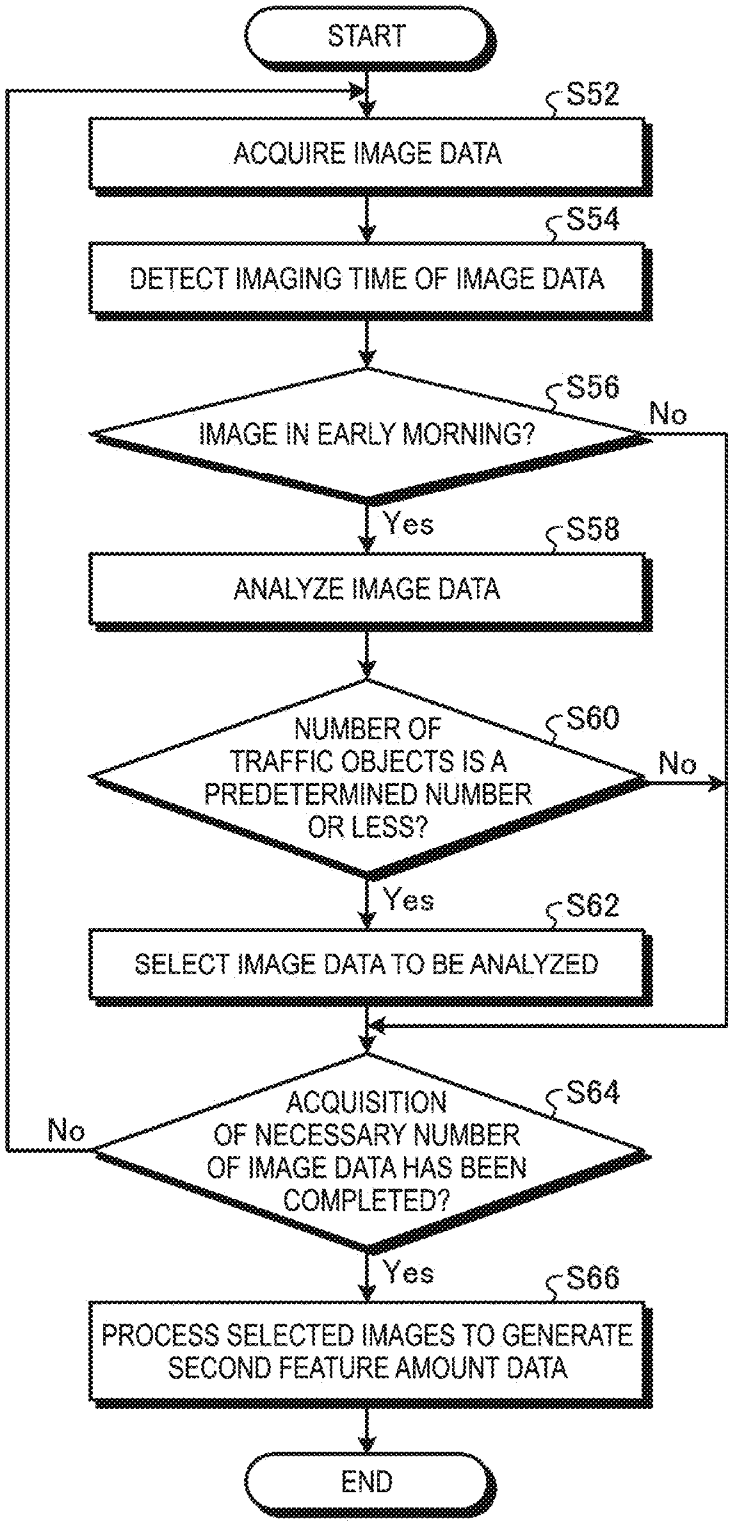
FIG. 12 is a flowchart illustrating an example of a state estimation method executed by a second processing unit.

The state estimation device 100 stores the output first feature amount data in the feature amount storage 133 (step S14). Then, the state estimation device 100 executes estimation processing in the second processing unit (step S16). FIG. 12 is a flowchart illustrating an example of a state estimation method executed by the second processing unit. The second processing unit 160 acquires image data (step S52). The second processing unit 160 detects the imaging time of the image data (step S54). The second processing unit 160 may acquire the imaging time from the imaging device 10 or may perform image analysis to acquire the imaging time from the luminance and illuminance of the image. The second processing unit 160 determines whether the image is an image in the early morning (step S56). If the second processing unit 160 determines that the image is not the image in the early morning (No in step S56), then the process proceeds to step S64.

If the second processing unit 160 determines that the image is the image in the early morning (second image data) (Yes in step S56), then the first processing unit 160 analyzes the image data (step S58). Specifically, the second processing unit 160 detects the traffic object by using the object estimation model M4. The second processing unit 160 determines whether the number of the traffic objects is a predetermined number or less (step S60). A determination criterion may be the presence or absence of the traffic object, or may be based on the size and position of the detected traffic object. If the second processing unit 160 determines that the number of the traffic objects is more than the predetermined number (No in step S60), then the process proceeds to step S64. If the second processing unit 160 determines that the number of the traffic objects is a predetermined number or less (yes in step S60) then the second processing unit 160 selects the image data to be analyzed (step S62).

If the second processing unit 160 determines No in step S56, determines No in step S60, or executes the processing in step S62, then the second processing unit 160 determines whether acquisition of a necessary number of image data has been completed (step S64).

If the second processing unit 160 determines that the acquisition of the necessary number of image data has not been completed (No in step S64), the process returns to step S52. Thus, the second processing unit 160 repeats the processing from step S52 to step S64 until the necessary number of image data are acquired.

If the second processing unit 160 determines that the acquisition of the necessary number of image data has been completed (Yes in Step S64), then the second processing unit 160 processes the selected image data to generate the first feature amount data (step S66). The second processing unit 160 inputs the selected image data to the second state estimation model M2, estimates the feature amount data, and outputs the estimated feature amount data.

Then, the state estimation device 100 combines the first feature amount data and the second feature amount data (step S18). The state estimation device 100 selects one piece of image data from each of the first feature amount data output by the first processing unit 150 and the second feature amount data output by the second processing unit 160 and combines the selected pieces of image data to generate feature amount data of one piece of image data. Thus, the feature amount data of the image data including both the feature amount of the traffic object extracted by the first feature amount data and the feature amount data of the traffic environment other than the traffic object extracted by the second feature amount data is generated.

Then, the state estimation device 100 calculates an evaluation value (step S20). The state estimation device 100 inputs the combined feature amount data to the feature estimation model M3 and estimates the installation state parameters of the imaging device 10 having obtained the input image data D10 by imaging in the third processing unit 170. The state estimation device 100 estimates a road area of the road 1100 in the image D11 indicated by the image data D10 based on the installation state parameters estimated by the feature estimation model M3. The state estimation device 100 associates the estimated installation state parameters and the road area with the image data D10 to store thereof in the storage 130.

The state estimation device 100 executes diagnosis based on the evaluation value (step S22). The state estimation device 100 diagnoses whether the installation state parameters of the estimated imaging device 10 are appropriate. Diagnosis on whether the installation state parameters of the imaging device 10 are appropriate includes diagnosing that the installation state parameters of the imaging device 10 are appropriate when the installation state parameters do not need to be, for example, reset or adjusted by the imaging device 10. The state estimation device 100 associates a diagnosis result with the imaging device 10 to store the diagnosis result in the storage 130. When diagnosing that the installation state parameters of the imaging device 10 are suitable, the state estimation device 100 can supply the diagnosis result, the installation state parameter, and the like to post-processing. When diagnosing that the installation state parameters of the imaging device 10 are not suitable, the state estimation device 100 can perform imaging again using the imaging device 10, and estimate the installation state parameters using the imaged image data D10.

The state estimation device 100 can estimate the installation state parameters with high accuracy by performing the processing described above. Specifically, by extracting the feature amount of the traffic object with the image data at nighttime by using the first state estimation model M1, the traffic object whose lighting device is turned on in a dark environment state can be specified with high accuracy. By extracting the feature amount of the traffic environment other than the traffic object with the image data in the early morning by using the second state estimation model M2, the feature amount of the traffic environment can be extracted with high accuracy using an image in a state of being not shielded by a moving object such as a vehicle. The state estimation device 100 can estimate the installation state parameters with high accuracy by combining the respective feature amounts and estimating the features. Since the frequency at which work is performed at nighttime is high, by performing processing using the image at nighttime and the image in the early morning, the installation state parameters can be estimated in a short period of time after the work is performed.

A case has been described where the above-described state estimation device 100 is provided outside the imaging device 10. However, the above-described state estimation device 100 is not limited thereto. For example, the state estimation device 100 may be incorporated in the imaging device 10 and implemented as a controller, a module, or the like of the imaging device 10. For example, the state estimation device 100 may be incorporated in traffic signals, lighting devices, communication devices, or the like installed in the traffic environment 1000.

The above-described state estimation device 100 may be implemented as a server device or the like. For example, the state estimation device 100 may be a server device that acquires the image data D10 from each of the plurality of imaging devices 10, estimates the installation state parameters from the image data D10, and provides the estimation result.

A case where the above-described learning device 200 generates the first state estimation model M1, the second state estimation model M2, the feature estimation model M3, and the object estimation model M4 is described. However, the learning device 200 is not limited thereto. For example, the learning device 200 may include two devices of a first device that generates the first state estimation model M1, the second state estimation model M2, the feature estimation model M3, and a second device that generates the object estimation model M2. The first state estimation model M1, the second state estimation model M2, and the feature estimation model M3 may be separate devices.

The present disclosure is not limited to a case where the first state estimation model M1, the second state estimation model M2, and the feature estimation model M3 are implemented as separate models and by separate learning units, but may be an example where both the models are integrated as an integrated model, and machine learning is also performed by one integrated machine learning unit. In other words, the present disclosure may include an example where machine learning is executed using one model and one learning unit.

Characteristic embodiments have been described in order to fully and clearly disclose the technology according to the appended claims. However, the appended claims are not limited to the above-described embodiments, and are configured to embody all variations and alternative configurations that can be created by those skilled in the art within the scope of the basic matters indicated in the present specification. Those skilled in the art can make various changes and modifications to the contents of the present disclosure based on the present disclosure. Therefore, these variations and modifications fall within the scope of the present disclosure. For example, in each embodiment, each functional unit, each means, each step, or the like can be added to another embodiment or can be replaced with each functional unit, each means, each step, or the like of another embodiment so as not to be logically inconsistent. In each embodiment, a plurality of functional units, means, steps, and the like can be combined into one or divided. The above-described embodiments of the present disclosure are not limited to implementations faithful to the embodiments described above, and may be implemented by appropriately combining the features or omitting some of the features.

SUPPLEMENTARY NOTE

Supplementary Note 1

A state estimation device including a first state estimator configured to estimate first feature amount data from input image data with a first object estimation model subjected to machine learning so as to estimate the first feature amount data obtained by estimating a feature amount of a first extraction target from input first image data by using first teacher data including the first image data obtained by an imaging device having imaged a traffic environment and first correct value data of the first extraction target including a moving object included in the first image data;

a second state estimator configured to estimate second feature amount data from input image data with a second object estimation model subjected to machine learning so as to estimate the second feature amount data obtained by estimating the feature amount of the first extraction target from the input first image data by using second teacher data including second image data obtained by an imaging device having imaged a traffic environment and second correct value data of a second extraction target including a road included in the second image data;

a feature estimator configured to estimate installation state parameters of an imaging device having obtained the input image data by imaging from data obtained by combining the first feature amount data and the second feature amount data with a state estimation model subjected to machine learning to estimate the installation state parameters of the imaging device having obtained the input image data by imaging by using third teacher data including image data obtained by the imaging device having imaged a traffic environment and correct value data of the installation state parameters of the imaging device having obtained the image data by imaging; and a diagnosis unit configured to diagnose an installation state of the imaging device based on the estimated installation state parameters.

Supplementary Note 2

In the state estimation device described in Supplementary Note 1, the state estimation device further includes a first preprocessor configured to perform processing such that the first image data obtained by the imaging device having imaged the traffic environment by imaging includes a first extraction target that can be used for estimation, and a second preprocessor configured to perform processing such that the second image data obtained by the imaging device having imaged the traffic environment by imaging includes a second extraction target that can be used for estimation, in which the first processor is configured to input the first image data processed by the processor to the first state estimation model and estimate the first feature amount data, and the second processor is configured to input the first image data processed by the processor to the second state estimation model and estimate the second feature amount data.

Supplementary Note 3

In the state estimation device described in Supplementary Note 1, the first image data is obtained by imaging an image at nighttime, and the second image data is obtained by imaging an image in the daytime.

Supplementary Note 4

In the state estimation device described in Supplementary Note 1, the state estimation device further includes a feature storage configured to store the first feature amount data.

Supplementary Note 5

In the state estimation device according to supplementary note 1, the first state estimator, the second state estimator, and the feature estimator are disposed on a cloud server.

Supplementary Note 6

In the state estimation device described in Supplementary Note 1, the diagnosis unit is configured to diagnose an installation state of the imaging device based on the installation state parameters estimated by the estimator and a bird's-eye view state of the traffic object indicated by the image data.

Supplementary Note 7

In the state estimation device described in Supplementary Note 6, the diagnosis unit is configured to compare an orientation of the traffic object indicated by the image data, and an orientation of the traffic object calculated based on the installation state parameters estimated by the estimator, and diagnose the installation state of the imaging device when a degree of coincidence is higher than a determination threshold value.

Supplementary Note 8

A state estimation method performed by a computer, the method including estimating first feature amount data from input image data with a first object estimation model subjected to machine learning so as to estimate the first feature amount data obtained by estimating a feature amount of a first extraction target from input first image data by using first teacher data including the first image data obtained by an imaging device having imaged a traffic environment and first correct value data of the first extraction target including a moving object included in the first image data, estimating second feature amount data from input image data with a second object estimation model subjected to machine learning so as to estimate the second feature amount data obtained by estimating the feature amount of the first extraction target from the input first image data by using second teacher data including second image data obtained by an imaging device having imaged a traffic environment and second correct value data of a second extraction target including a road included in the second image data, estimating installation state parameters of an imaging device having obtained the input image data by imaging from data obtained by combining the first feature amount data and the second feature amount data with a state estimation model subjected to machine learning to estimate the installation state parameters of the imaging device having obtained the input image data by imaging by using third teacher data including image data obtained by the imaging device having imaged a traffic environment and correct value data of the installation state parameters of the imaging device having obtained the image data by imaging, and diagnosing an installation state of the imaging device based on the estimated installation state parameters.

Supplementary Note 9

A state estimation program causing a computer to execute estimating first feature amount data from input image data with a first object estimation model subjected to machine learning so as to estimate the first feature amount data obtained by estimating a feature amount of a first extraction target from input first image data by using first teacher data including the first image data obtained by an imaging device having imaged a traffic environment and first correct value data of the first extraction target including a moving object included in the first image data, estimating second feature amount data from input image data with a second object estimation model subjected to machine learning so as to estimate the second feature amount data obtained by estimating the feature amount of the first extraction target from the input first image data by using second teacher data including second image data obtained by an imaging device having imaged a traffic environment and second correct value data of a second extraction target including a road included in the second image data, estimating installation state parameters of an imaging device having obtained the input image data by imaging from data obtained by combining the first feature amount data and the second feature amount data with a state estimation model subjected to machine learning to estimate the installation state parameters of the imaging device having obtained the input image data by imaging by using third teacher data including image data obtained by the imaging device having imaged a traffic environment and correct value data of the installation state parameters of the imaging device having obtained the image data by imaging, and diagnosing an installation state of the imaging device based on the estimated installation state parameters.

Supplementary Note 10

A state estimation device including a first state estimator trained to estimate first feature amount data from first image data including a moving object obtained by an imaging device by imaging, a second state estimator trained to estimate second feature amount data from second image data including a road obtained by the imaging device by imaging, and a feature estimator trained to estimate installation state parameters of the imaging device having obtained input image data by imaging from the first feature amount data and the second feature amount data.

Supplementary Note 11

In the state estimation device described in Supplementary Note 10, the second image data is obtained by imaging an image having a smaller number of moving objects than that of the first image data.

REFERENCE SIGNS

1 System
10 Imaging device
100 State estimation device
110 Input unit
120 Communicator
130 Storage
131 Program
132 Setting data
133 Feature storage
140 Controller
141 Processor
142 Estimator
143 Diagnosis unit
150 First processing unit
152, 162, 172 Model acquirer
154, 164 Preprocessor
156 Use image determiner
158, 166 State estimator
160 Second processing unit
170 Third processing unit
174 Feature combiner
176 Feature estimator
200 Learning device
210 Display
220 Operation inputter
230 Communicator
240 Storage
241 Program
242 Teacher data
250 Controller
251 First acquirer
252 First machine learning unit
253 Second acquirer
254 Second machine learning unit
255 Third acquirer
256 Third machine learning unit
257 Fourth acquirer
258 Fourth machine learning unit
1000 Traffic environment
1100 Road
1200 Traffic object
500, 520, 540, 2100 Input layer
510, 530, 530, 2200 Intermediate layer
2210 Feature extraction layer
2220 Connected layer
2300 Output layer
D10 Image data
D11 Image
D21 Correct value data
D22 Correct value data
D100 Predetermined area
M1 First state estimation model M2 Second state estimation model
M3 Feature estimation model
M4 Object estimation model

The invention claimed is:

1. A state estimation device comprising:

a first state estimator configured to estimate first feature amount data from input image data with a first object estimation model subjected to machine learning to estimate the first feature amount data obtained by estimating a feature amount of a first extraction target from input first image data by using first teacher data comprising the first image data obtained by an imaging device having imaged a traffic environment and first correct value data of the first extraction target comprising a moving object in the first image data;

a second state estimator configured to estimate second feature amount data from input image data with a second object estimation model subjected to machine learning to estimate the second feature amount data obtained by estimating the feature amount of the first extraction target from the input first image data by using second teacher data comprising second image data obtained by an imaging device having imaged a traffic environment and second correct value data of a second extraction target comprising a road in the second image data;

a feature estimator for estimating installation state parameters of an imaging device having obtained the input image data by imaging by using the first feature amount data and the second feature amount data with a state estimation model subjected to machine learning to estimate the installation state parameters of the imaging device having obtained the input image data by imaging by using third teacher data comprising image data obtained by the imaging device having imaged a traffic environment and correct value data of the installation state parameters of the imaging device having obtained the image data by imaging; and a diagnosis unit configured to diagnose an installation state of the imaging device based on the estimated installation state parameters.

2. The state estimation device according to claim 1, further comprising:

a first preprocessor configured to perform processing such that the first image data obtained by the imaging device having imaged the traffic environment by imaging comprises a first extraction target that can be used for estimation, and a second preprocessor configured to perform processing such that the second image data obtained by the imaging device having imaged the traffic environment by imaging comprises a second extraction target that can be used for estimation, wherein the first processor is configured to input the first image data processed by the processor to the first state estimation model and estimate the first feature amount data, and the second processor is configured to input the first image data processed by the processor to the second state estimation model and estimate the second feature amount data.

3. The state estimation device according to claim 1, wherein the first image data is obtained by imaging an image at nighttime, and the second image data is obtained by imaging an image in the daytime.

4. The state estimation device according to claim 1, further comprising:

a feature storage configured to store the first feature amount data.

5. The state estimation device according to claim 1, wherein the first state estimator, the second state estimator, and the feature estimator are located on a cloud server.

6. The state estimation device according to claim 1, wherein the diagnosis unit is configured to diagnose an installation state of the imaging device based on the installation state parameters estimated by the estimator and a bird's-eye view state of the traffic object indicated by the image data.

7. The state estimation device according to claim 6, wherein the diagnosis unit is configured to compare an orientation of the traffic object indicated by the image data, and an orientation of the traffic object calculated based on the installation state parameters estimated by the estimator, and diagnose the installation state of the imaging device when a degree of coincidence is higher than a determination threshold value.

8. A state estimation method performed by a computer, the method comprising:

estimating first feature amount data from input image data with a first object estimation model subjected to machine learning to estimate the first feature amount data obtained by estimating a feature amount of a first extraction target from input first image data by using first teacher data comprising the first image data obtained by an imaging device having imaged a traffic environment and first correct value data of the first extraction target comprising a moving object in the first image data;

estimating second feature amount data from input image data with a second object estimation model subjected to machine learning to estimate the second feature amount data obtained by estimating the feature amount of the first extraction target from the input first image data by using second teacher data comprising second image data obtained by an imaging device having imaged a traffic environment and second correct value data of a second extraction target comprising a road in the second image data;

estimating installation state parameters of an imaging device having obtained the input image data by imaging by using the first feature amount data and the second feature amount data with a state estimation model subjected to machine learning to estimate the installation state parameters of the imaging device having obtained the input image data by imaging by using third teacher data comprising image data obtained by the imaging device having imaged a traffic environment and correct value data of the installation state parameters of the imaging device having obtained the image data by imaging; and diagnosing an installation state of the imaging device based on the estimated installation state parameters.

9. A non-transitory computer-readable medium storing a state estimation program causing a computer to execute estimating first feature amount data from input image data with a first object estimation model subjected to machine learning to estimate the first feature amount data obtained by estimating a feature amount of a first extraction target from input first image data by using first teacher data comprising the first image data obtained by an imaging device having imaged a traffic environment and first correct value data of the first extraction target comprising a moving object in the first image data;

estimating second feature amount data from input image data with a second object estimation model subjected to machine learning to estimate the second feature amount data obtained by estimating the feature amount of the first extraction target from the input first image data by using second teacher data comprising second image data obtained by an imaging device having imaged a traffic environment and second correct value data of a second extraction target comprising a road in the second image data;

estimating installation state parameters of an imaging device having obtained the input image data by imaging by using the first feature amount data and the second feature amount data with a state estimation model subjected to machine learning to estimate the installation state parameters of the imaging device having obtained the input image data by imaging by using third teacher data comprising image data obtained by the imaging device having imaged a traffic environment and correct value data of the installation state parameters of the imaging device having obtained the image data by imaging; and diagnosing an installation state of the imaging device based on the estimated installation state parameters.

* * * * *